(12) United States Patent
Ambur et al.

(10) Patent No.: US 12,214,564 B2
(45) Date of Patent: Feb. 4, 2025

(54) OPTICAL ASSEMBLY WITH ENCAPSULATED MULTILAYER OPTICAL FILM AND METHODS OF MAKING SAME

(71) Applicant: 3M INNOVATIVE PROPERTIES COMPANY, St. Paul, MN (US)

(72) Inventors: Gregg A. Ambur, San Clemente, CA (US); Douglas S. Dunn, Woodbury, MN (US); Henry A. Kostalik, IV, Minneapolis, MN (US); Christopher S. DeGraw, Inver Grove Heights, MN (US); Thomas P. Klun, Lakeland, MN (US); Benjamin R. Coonce, South St. Paul, MN (US); Richard J. Pokorny, Maplewood, MN (US); Chunjie Zhang, Shoreview, MN (US); Laurent Froissard, Cottage Grove, MN (US); Joseph S. Warner, Hudson, WI (US)

(73) Assignee: 3M Innovative Properties Company, St. Paul, MN (US)

(*) Notice: Subject to any disclaimer, the term of this patent is extended or adjusted under 35 U.S.C. 154(b) by 302 days.

(21) Appl. No.: 17/780,560

(22) PCT Filed: Dec. 1, 2020

(86) PCT No.: PCT/IB2020/061319
§ 371 (c)(1),
(2) Date: May 27, 2022

(87) PCT Pub. No.: WO2021/111291
PCT Pub. Date: Jun. 10, 2021

(65) Prior Publication Data
US 2022/0410511 A1 Dec. 29, 2022

Related U.S. Application Data

(60) Provisional application No. 63/198,987, filed on Nov. 30, 2020, provisional application No. 62/944,906, filed on Dec. 6, 2019.

(51) Int. Cl.
*B29D 11/00* (2006.01)
*B29K 75/00* (2006.01)
(Continued)

(52) U.S. Cl.
CPC ...... *B29D 11/0073* (2013.01); *B29D 11/0048* (2013.01); *B29D 11/00644* (2013.01);
(Continued)

(58) Field of Classification Search
CPC .......... B29D 11/0073; B29D 11/00009; B02B 5/305
See application file for complete search history.

(56) References Cited

U.S. PATENT DOCUMENTS

| 4,262,072 A | 4/1981 | Wendling et al. |
| 5,882,774 A | 3/1999 | Jonza et al. |

(Continued)

FOREIGN PATENT DOCUMENTS

| CN | 101285958 A | 10/2008 |
| CN | 102124400 A | 7/2011 |

(Continued)

OTHER PUBLICATIONS

International Search Report for PCT International Application No. PCT/IB2020/061319, mailed on Feb. 19, 2021, 4 pages.

*Primary Examiner* — Alison L Hindenlang
*Assistant Examiner* — Virak Nguon
(74) *Attorney, Agent, or Firm* — Sriram Srinivasan

(57) ABSTRACT

An optical assembly (200) including an encapsulated multilayer optical film (250). Methods of making and using such optical assemblies also are disclosed.

12 Claims, 11 Drawing Sheets

(51) Int. Cl.
  *B29K 83/00*   (2006.01)
  *B29K 105/00*  (2006.01)
  *B29K 105/16*  (2006.01)
  *B29K 509/02*  (2006.01)
  *G02B 5/30*    (2006.01)

(52) U.S. Cl.
  CPC ........ *G02B 5/305* (2013.01); *B29D 11/00932* (2013.01); *B29K 2075/00* (2013.01); *B29K 2083/00* (2013.01); *B29K 2105/0002* (2013.01); *B29K 2105/162* (2013.01); *B29K 2509/02* (2013.01)

(56) References Cited

U.S. PATENT DOCUMENTS

| | | |
|---|---|---|
| 6,045,894 A | 4/2000 | Jonza et al. |
| 6,368,699 B1 | 4/2002 | Gilbert et al. |
| 6,531,230 B1 | 3/2003 | Weber et al. |
| 6,609,795 B2 | 8/2003 | Weber et al. |
| 6,667,095 B2 | 12/2003 | Wheatley et al. |
| 6,783,349 B2 | 8/2004 | Neavin et al. |
| 6,788,463 B2 | 9/2004 | Merrill et al. |
| 7,271,951 B2 | 9/2007 | Weber et al. |
| 7,632,568 B2 | 12/2009 | Padiyath et al. |
| 7,652,736 B2 | 1/2010 | Padiyath et al. |
| 7,952,805 B2 | 5/2011 | McGurran et al. |
| 8,967,800 B2 | 3/2015 | Sheldon |
| 9,527,252 B2 | 12/2016 | Sheldon et al. |
| 9,557,568 B1 | 1/2017 | Ouderkirk et al. |
| 2010/0012262 A1* | 1/2010 | Hsu ............ G02C 7/12 264/1.32 |
| 2019/0310404 A1 | 10/2019 | Klun et al. |

FOREIGN PATENT DOCUMENTS

| | | |
|---|---|---|
| CN | 109070232 A | 12/2018 |
| WO | 1995017303 A1 | 6/1995 |
| WO | 1999039224 A1 | 8/1999 |
| WO | 2018147935 A2 | 8/2018 |
| WO | 2018163009 A1 | 9/2018 |
| WO | WO-2019079033 A1 * | 4/2019 ....... B29D 11/00548 |

* cited by examiner

OPTICAL ASSEMBLY WITH ENCAPSULATED MULTILAYER OPTICAL FILM AND METHODS OF MAKING SAME

CROSS REFERENCE TO RELATED APPLICATIONS

This application is a national stage filing under 35 U.S.C. 371 of International Application No. PCT/IB2020/061319, filed 1 Dec. 2020, which claims the benefit of U.S. Provisional Application No. 62/944,906, filed 6 Dec. 2019 and U.S. Provisional Application No. 63/198,987, filed 30 Nov. 2020, the entire disclosure of each of which is incorporated by reference herein.

TECHNICAL FIELD

The present disclosure relates to an optical assembly including an encapsulated optical film, and more particularly, to an impact and abrasion resistant optical lens assembly including an encapsulated multilayer optical film.

BACKGROUND

Multilayer Optical Films (MOFs) include individual microlayers having different refractive index characteristics so that some light is reflected at interfaces between adjacent microlayers. The microlayers are sufficiently thin so that light reflected at a plurality of the interfaces undergoes constructive or destructive interference to give the multilayer optical film the desired reflective or transmissive properties. For multilayer optical films designed to reflect light at ultraviolet, visible, or near-infrared wavelengths, each microlayer generally has an optical thickness (a physical thickness multiplied by refractive index) of less than about 1 micron. Thicker layers are also typically included, such as skin layers at the outer surfaces of the multilayer optical film, or protective boundary layers (PBLs) disposed within the multilayer optical films, that separate coherent groupings (sometimes referred to "packets") of microlayers. However, even with co-extruded outer skin layers, MOFs are prone to surface damage such as gouging, scratching and scuffing that may occur during handling and use. Such damage can detract from performance and/or aesthetic appearance of the MOF.

SUMMARY

The problem of surface damage to MOFs applied to optical assemblys to form an optical assembly may be addressed by encapsulating the MOF with one or more impact and abrasion-resistant layers covering the entire outer surfaces of the MOF. In some applications, for example, those applications in which an MOF must achieve a complex 3-dimensional (3-D) shape it may be desirable to pre-shape the MOF, for example, by thermoforming. If the abrasion-resistant layer is chemically crosslinked, then problems with stress cracking may occur during thermoforming. Advantageously, in some embodiments the present disclosure provides abrasion-resistant layer compositions for use in encapsulating an MOF in a shaped optical assembly such as a lens using injection-compression molding along with insert/two shot molding to mold the MOF in the center of a shaped optical assembly. In addition, the edges of the MOF are encapsulated within the molded shaped optical assembly. Preferably, the shaped optical assembly has a thickness that is 3 mm or less. The shaped optical assembly may include a retaining ring mounted on a peripheral edge of the shaped optical assembly.

This configuration, with the MOF near the center of the shaped optical assembly and formable hard coat films applied to the lens' surfaces, acts to protect the MOF against scratching, abrasion or other damage, and more particularly results in the lens passing ballistic test requirements.

Thus, in one aspect, the present disclosure provides a shaped optical assembly comprising an encapsulated multilayer optical film. An optical assembly blank is insert molded directly onto a first hard-coat film preform using a first flowable material, wherein the optical assembly blank includes a multilayer optical film preform insert molded onto a second hard-coat film preform using a second flowable material.

The multilayer optical film preform includes a multilayer optical film that is encapsulated by the first and second flowable materials. Preferably, the shaped optical assembly has a maximum thickness of 3 mm or less. Preferably the first and/or second flowable materials comprise one or more polycarbonate resins. Preferably first and second hard-coat film preforms each include a (copolymeric) substrate comprised of one or more polycarbonate resins.

The first and second hard-coat film preforms each include a (co)polymeric substrate, preferably a polycarbonate substrate, having two opposed major surfaces and an at least partially cured hard coat layer on at least one of the opposed surfaces. The at least partially cured hard coat layer is formed by at least partially curing a curable hard coat composition including: (a) 70 to 96 weight percent of at least one urethane (meth)acrylate compound having an average (meth)acrylate functionality of 2 to 9.5 based on the total weight of components (a) to (d); (b) 2 to 20 weight percent of at least one (meth)acrylate monomer having a (meth)acrylate functionality of 1 to 2, based on the total weight of components a) to d), optionally wherein the (meth)acrylate monomer does not comprise a urethane (meth)acrylate compound or a silicone (meth)acrylate; (c) an optional 0.5 to 2 weight percent of at least one silicone (meth)acrylate, based on the total weight of components (a) to (d); (d) an optional effective amount of at least one photoinitiator; (e) an optional plurality of inorganic nanoparticles and (f) optionally, at least one solvent.

In another aspect, the present disclosure provides a method of making a shaped optical assembly including an encapsulated multilayer optical film. The method comprises:
(i) forming an optical assembly blank by:
(a) providing a female thermoforming mold having an internal mold cavity defined by a curved concave platen and a curved convex platen opposite the curved concave platen, wherein the curved concave platen and the curved convex platen are separable when the female thermoforming mold is open, separated by a first gap when the internal cavity is being injected with a molten resin, and separated by a second gap smaller than the first gap when the female thermoforming mold is closed;
(b) opening the female thermoforming mold and positioning a multilayer optical film preform in contact with the curved convex platen, wherein the multilayer optical film preform has a curvature substantially identical to that of the curved convex platen;
(c) positioning a first hard coat film preform with a hard-coat in contact with the curved concave platen, wherein the first hard coat film preform has a curvature substantially identical to that of the curved concave platen, the first hard coat film preform comprising a first (co)polymeric substrate having two opposed major surfaces and an at least partially cured hard coat layer on at least one of the opposed surfaces, the at least partially cured hard coat layer being formed by at least partially curing a curable hard coat composition;

(d) injecting a first flowable material into the internal mold cavity while the curved concave platen and the curved convex platen are maintained separated by the first gap;

(e) closing the female thermoforming mold to achieve the second gap and cooling the mold while maintaining the second gap in order to solidify the first flowable material and form the optical assembly blank;

(ii) opening the female thermoforming mold and positioning the optical assembly blank in contact with the curved concave platen;

(iii) positioning a second hard coat film preform in contact with the curved convex platen, wherein the second hard coat film preform has a curvature substantially identical to that of the curved convex platen, the second hard coat film preform comprising a second (co)polymeric substrate having two opposed major surfaces and an at least partially cured hard coat layer on at least one of the opposed surfaces, the at least partially cured hard coat layer being formed by at least partially curing a curable hard coat composition substantially identical to the curable hard-coat composition of step (c);

iv) injecting a second flowable material into the internal mold cavity while the curved concave platen and the curved convex platen are maintained separated by the first gap;

v) partially closing the female thermoforming mold to achieve a third gap between the first gap and the second gap and cooling the mold while maintaining the third gap in order to solidify the second flowable material and obtain the shaped optical assembly, wherein the multilayer optical film is encapsulated by the first and second flowable materials.

The curable hard-coat composition of step (c) includes:

A. 70 to 96 weight percent of at least one urethane (meth)acrylate compound having an average (meth) acrylate functionality of 2 to 9.5, based on the total weight of components A to D, B. 2 to 20 weight percent of at least one (meth)acrylate monomer having a (meth)acrylate functionality of 1 to 2, based on the total weight of components A to D, wherein the (meth)acrylate monomer does not comprise a urethane (meth)acrylate compound or a silicone (meth)acrylate, C. an optional 0.5 to 2 weight percent of at least one silicone (meth)acrylate based on the total weight of components A to D, D. an optional effective amount of at least one photoinitiator, E. an optional plurality of inorganic nanoparticles and F. optionally, at least one solvent.

Preferably the first and/or second flowable materials comprise one or more polycarbonate resins. Preferably first and second hard-coat film preforms each include a (copolymeric) substrate comprised of one or more polycarbonate resins. Preferably, the shaped optical assembly has a maximum thickness of 3 mm or less.

Various technical problems are solved and unexpected results and advantages are obtained in exemplary embodiments of the disclosure. For example, shaped optical assemblies according to the present disclosure generally exhibit improved scratch, abrasion and delamination resistance when compared to optical assemblies with an MOF film applied to an exterior surface of the optical assembly.

Although it is known to incorporate a specially configured MOF film in an optical assembly such as a lens used in laser protection eyewear to provide selective transmission of visible light and substantial reflection of laser light at designated wavelengths or ranges of wavelength, known laser protection eyewear lenses incorporating a multilayer optical film (MOF) positioned on or near the outer surfaces of the lens generally are unable to pass the ballistic impact test requirements according to MIL-PRF31013, clause 3.5.1.1 for ballistic impact protection of eyewear frame under the United States Military Combat Eye Protection standard. The MOF typically delaminates under the impact of the ballistic projectile. A secondary issue with the MOF on the outer surface of the lens is the MOF delaminates during the edging process to machine a profile lens shape from a lens blank. Another issue is the MOF may delaminate under normal customer use.

Additionally, the MOF is subject to scratching, abrasion, or other damage when located on or near the outer surfaces of the lens. The addition of a hard coat on the lens surface using typical highly crosslinked hard coat materials generally causes the lens to fail the ballistic impact test. This is due to the hard coat cracking under the ballistic impact and starting a stress concentration that fractures the polycarbonate (PC) lens material.

One solution to address some or all of these technical problems is to encapsulate the MOF on all sides using a flowable (co)polymeric material, preferably comprising one or more PC resins, resulting in passing the ballistic impact test. Furthermore, a lens configuration with the MOF near the center of the lens thickness and use of a formable hard coat film on the lens major surfaces protects the MOF against scratching, abrasion or other damage, while allowing the lens to pass the ballistic impact test requirements according to MIL-PRF31013, clause 3.5.1.1 for ballistic impact protection of eyewear frame under the United States Military Combat Eye Protection standard.

To generate a lens with the MOF encapsulated by PC lens materials, an injection compression/two shot molding process is used. Thus, embodiments of the disclosure make use of injection-compression molding along with two-shot insert molding to mold the MOF in the center of a lens that is generally 3 mm or less in thickness. In addition, the edges of the MOF are encapsulated within the molded lens resin and thus less subject to delamination at the edges.

The MOF is encapsulated by the flowable (co)polymeric material (preferably comprising one or more PC resins) by molding a first shot with the MOF insert molded on one side of the first shot lens where the MOF is smaller than the finished lens geometry. The formable hard coated film is placed in the molding tool on the side opposite to the MOF. The first shot is then placed in a second mold cavity with formable hard coat film (preferably applied to a PC substrate) on the side opposite to the first shot, and flowable (co)polymeric material (preferably comprising one or more PC resins) is over-molded on the first shot, resulting in the MOF being encapsulated in PC material.

Since the finished lens thickness generally needs to be less than 3 mm, the first and second shot molding thickness is usually 1.5 mm or less. At these thicknesses, the PC needed for the application cannot fill the mold cavity due to the high viscosity of the PC material. This issue may be resolved using injection-compression molding where during fill the mold cavity is thicker allowing the flowable (co)polymeric material (preferably comprising one or more PC resins) to fill the cavity and then compression of the cavity is used to have the correct final thickness. This injection compression process also reduces the shear heating of the flowable (co)polymeric material (preferably comprising one or more PC resins) near the mold gate that causes localized melting of the MOF and a blemish in the MOF of the final lens.

Listing of Exemplary Embodiments

The following is a listing of exemplary embodiments of the present disclosure:
- A. A method of making a shaped optical assembly including an encapsulated multilayer optical film, the method comprising:
  - i) forming an optical assembly blank by:
    - a) providing a female thermoforming mold having an internal mold cavity defined by a curved concave platen and a curved convex platen opposite the curved concave platen, wherein the curved convex platen and the curved concave platen are separable when the female thermoforming mold is open, separated by a first gap when the internal cavity is being injected with a molten resin, and separated by a second gap smaller than the first gap when the female thermoforming mold is closed;
    - b) opening the female thermoforming mold and positioning a multilayer optical film preform in contact with the curved convex platen, wherein the multilayer optical film preform has a curvature substantially identical to that of the curved convex platen;
    - c) positioning a first hard coat film preform with a hard-coat in contact with the curved concave platen, wherein the first hard coat film preform has a curvature substantially identical to that of the curved concave platen, the first hard coat film preform comprising a first (co)polymeric substrate having two opposed major surfaces and an at least partially cured hard coat layer on at least one of the opposed surfaces, the at least partially cured hard coat layer being formed by at least partially curing a curable hard coat composition comprising:
      - A. 70 to 96 weight percent of at least one urethane (meth)acrylate compound having an average (meth)acrylate functionality of 2 to 9.58, based on the total weight of components A to D,
      - B. 2 to 20 weight percent of at least one (meth)acrylate monomer having a (meth)acrylate functionality of 1 to 2, based on the total weight of components A to D, optionally wherein the (meth)acrylate monomer does not comprise a urethane (meth)acrylate compound or a silicone (meth)acrylate,
      - C. an optional 0.5 to 2 weight percent of at least one silicone (meth)acrylate based on the total weight of components A to D,
      - D. an optional effective amount of at least one photoinitiator,
      - E. an optional plurality of inorganic nanoparticles and
      - F. optionally, at least one solvent;
    - d) injecting a first flowable material into the internal mold cavity while the curved concave platen and the curved convex platen are maintained separated by the first gap;
    - e) closing the female thermoforming mold to achieve the second gap and cooling the mold while maintaining the second gap in order to solidify the first flowable material and form the optical assembly blank;
  - ii) opening the female thermoforming mold and positioning the optical assembly blank in contact with the curved concave platen;
  - iii) positioning a second hard coat film preform in contact with the curved convex platen, wherein the second hard coat film preform has a curvature substantially identical to that of the curved convex platen, the second hard coat film preform comprising a second (co)polymeric substrate having two opposed major surfaces and an at least partially cured hard coat layer on at least one of the opposed surfaces, the at least partially cured hard coat layer being formed by at least partially curing a curable hard coat composition substantially identical to the curable hard-coat composition of step (c);
  - iv) injecting a second flowable material into the internal mold cavity while the curved concave platen and the curved convex platen are maintained separated by the first gap;
  - v) partially closing the female thermoforming mold to achieve a third gap between the first gap and the second gap and cooling the mold while maintaining the third gap in order to solidify the second flowable material and obtain the shaped optical assembly, wherein the multilayer optical film is encapsulated by the first and second flowable materials.
- B. The method of claim 1, wherein the shaped optical assembly has a maximum thickness of 3 mm or less, optionally wherein the shaped optical assembly has a radius of curvature of 65 to 68 millimeters.
- C. The method of any preceding Embodiment, wherein the urethane (meth)acrylate compound of component A includes at least one of an isocyanurate ring or a biuret group.
- D. The method of any preceding Embodiment, wherein the (meth)acrylate monomer of component B comprises at least one of 1,6-hexanediol di(meth)acrylate or an alkoxylated tetrahydrofurfuryl (meth)acrylate.
- E. The method of any preceding Embodiment, wherein the silicone (meth)acrylate of component C is present in the curable composition.
- F. The method of any preceding Embodiment, wherein the effective amount of a photoinitiator of component D is present in the curable composition.
- G. The method of any preceding Embodiment, wherein the plurality of inorganic nanoparticles of component E is present in the curable composition, optionally wherein the plurality of inorganic nanoparticles comprise α-alumina nanoparticles.
- H. The method of any preceding Embodiment, wherein the solvent of component F is present in the curable composition.
- I. The method of claim 1, wherein one or more of the first (co)polymeric substrate, the second (co)polymeric substrate, the first flowable material, and the second flowable material comprise one or more polycarbonate resins, optionally wherein at least one of following conditions applies: (i) the first flowable material is the same composition as the second flowable material; (ii) the first (co)polymeric substrate is the same composition as the second (co)polymeric substrate.

J. The method of any preceding Embodiment, wherein the first gap is from 1.51 to 2.5 mm, the second gap is from 1 to 1.5 mm, and the third gap is from 1.6 to 3 mm.

K. The method of any preceding Embodiment, wherein the multilayer optical film is a reflective polarizer film.

L. The method of Embodiment K, wherein the reflective polarizer film comprises an optical stack, and wherein a major surface of the reflective polarizer film comprises a layer that is coextruded with the optical stack.

M. A shaped optical assembly including an encapsulated multilayer optical film made according to the method of any preceding Embodiment, optionally wherein the shaped optical assembly is a lens.

N. A shaped optical assembly comprising an optical assembly blank that is insert molded directly onto a first hard-coat film preform using a first flowable material, wherein the optical assembly blank comprises an optical film preform insert molded onto a second hard-coat film preform using a second flowable material, wherein the multilayer optical film preform comprises a multilayer optical film that is encapsulated by the first and second flowable materials, further wherein the first and second hard-coat preforms each comprise a (co)polymeric substrate having two opposed major surfaces and an at least partially cured hard coat layer on at least one of the opposed surfaces, the at least partially cured hard coat layer being formed by at least partially curing a curable hard coat composition comprising:
a) 70 to 96 weight percent of at least one urethane (meth)acrylate compound
  i. having an average (meth)acrylate functionality of 2 to 9.5, based on the total weight of components a) to d);
b) 2 to 20 weight percent of at least one (meth)acrylate monomer having a (meth)acrylate functionality of 1 to 2, based on the total weight of components a) to d), optionally wherein the (meth)acrylate monomer does not comprise a urethane (meth)acrylate compound or a silicone (meth)acrylate;
c) an optional 0.5 to 2 weight percent of at least one silicone (meth)acrylate, based on the total weight of components a) to d);
d) an optional effective amount of at least one photoinitiator;
e) an optional plurality of inorganic nanoparticles and
f) optionally, at least one solvent.

O. The shaped optical assembly of Embodiment N, wherein the multilayer optical film comprises a plurality of alternating polymeric layers reflecting or transmitting light primarily by optical interference, optionally wherein the shaped optical assembly further comprises a retaining ring positioned on a peripheral edge of the shaped optical assembly.

P. The shaped optical assembly of Embodiment N or O, wherein a melting temperature of the optical assembly blank is substantially larger than a glass transition temperature of the multilayer optical film, optionally wherein the melting temperature of the optical assembly blank is at least about 50° C. larger than the glass transition temperature of the multilayer optical film.

Q. The shaped optical assembly of any one of Embodiments N, O or P, wherein at least one of the following conditions is satisfied: component iv) is present in the curable hard-coat composition; component v) is present in the curable hard-coat composition; or component vi) is present in the curable hard-coat composition.

R. The shaped optical assembly of any one of Embodiments N, O, P or Q, wherein the urethane (meth) acrylate compound of component (i) includes at least one of an isocyanurate ring or a biuret group, optionally wherein the (meth)acrylate monomer of component (ii) comprises at least one of 1,6-hexanediol di(meth)acrylate or an alkoxylated tetrahydrofurfuryl (meth)acrylate.

S. The shaped optical assembly of any one of Embodiments N, O, P, Q or R, wherein one or more of the first (co)polymeric substrate, the second (co)polymeric substrate, the first flowable material, and the second flowable material comprise one or more polycarbonate resins, optionally wherein at least one of following conditions applies: (i) the first flowable material is the same composition as the second flowable material; (ii) the first (co)polymeric substrate is the same composition as the second (co)polymeric substrate.

T. The shaped optical assembly of any one of Embodiments N, O, P, Q, R or S, wherein the multilayer optical film is a reflective polarizer film and the shaped optical assembly is a lens having a maximum thickness of 3 mm or less and a radius of curvature of 65 to 68 millimeters, optionally wherein the lens passes MIL-PRF31013, clause 3.5.1.1 for ballistic impact protection of eyewear frame under the United States Military Combat Eye Protection standard.

BRIEF DESCRIPTION OF THE DRAWINGS

The disclosure may be more completely understood in consideration of the following detailed description of various embodiments of the disclosure in connection with the accompanying figures, in which.

Figure 1:
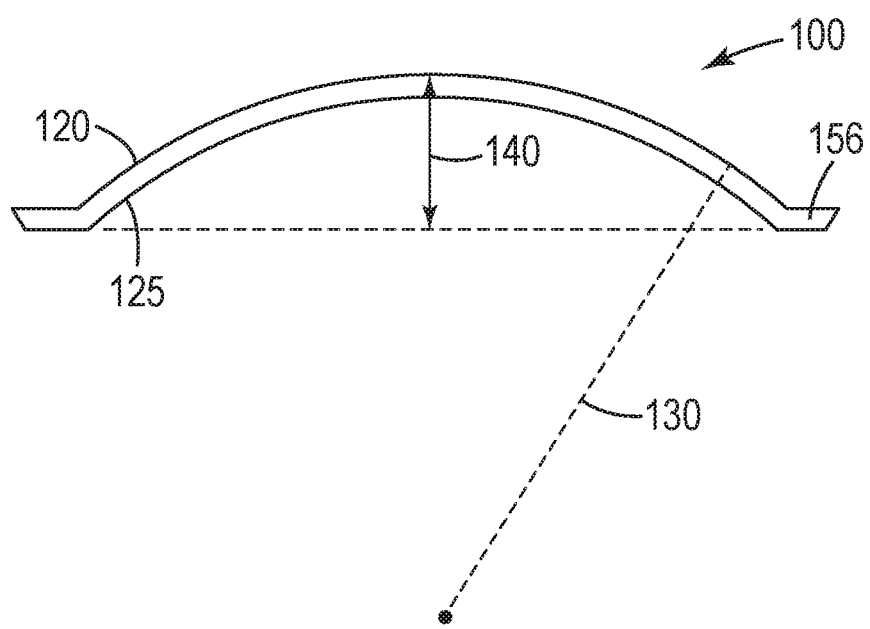
FIG. 1 is a schematic cross-sectional view of an exemplary film preform useful in forming an optical assembly including an encapsulated multilayer optical film according to exemplary embodiments of the present disclosure.

In the drawings, like reference numerals indicate like elements. While the above-identified drawing, which may not be drawn to scale, sets forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should understood that:

The term "encapsulated" with particular reference to a multilayer optical film means that the multilayer optical film is fully enclosed by one or more surrounding materials that act to protect the multilayer optical film with respect to scratching, abrasion, or other damage.

The terms "(co)polymer" or "(co)polymers" includes homopolymers and copolymers, as well as homopolymers or copolymers that may be formed in a miscible blend, e.g., by coextrusion or by reaction, including, e.g., transesterification. The term "copolymer" includes random, block and star (e.g. dendritic) copolymers.

The term "(meth)acryl" or "(meth)acrylate" with respect to a monomer, oligomer or means a vinyl-functional alkyl ester formed as the reaction product of an alcohol with an acrylic or a methacrylic acid.

The phrase "average (meth)acrylate functionality" refers to the average number of (meth)acrylate groups per molecule.

The phrase "urethane (meth)acrylate compound" means a compound having at least one (preferably at least 2, 3, 4, or more) carbamate group (i.e., —NHC(=O)O—) and at least one (meth)acryl group.

The term "female mold insert" refers to a mold insert that is inwardly concave in the region of the mold insert that is used to form the desired molded part shape (i.e., exclusive of flash).

The term "male mold insert" refers to a mold insert that is outwardly convex in the region of the mold insert that is used to form the desired molded part shape (i.e., exclusive of flash).

The term "adjoining" with reference to a particular layer means joined with or attached to another layer, in a position wherein the two layers are either next to (i.e., adjacent to) and directly contacting each other, or contiguous with each other but not in direct contact (i.e., there are one or more additional layers intervening between the layers).

By using terms of orientation such as "atop", "on", "over," "covering", "uppermost", "underlying" and the like for the location of various elements in the disclosed coated articles, we refer to the relative position of an element with respect to a horizontally-disposed, upwardly-facing substrate. However, unless otherwise indicated, it is not intended that the substrate or articles should have any particular orientation in space during or after manufacture.

By using the term "overcoated" to describe the position of a layer with respect to a substrate or other element of an article of the present disclosure, we refer to the layer as being atop the substrate or other element, but not necessarily contiguous to either the substrate or the other element.

By using the term "separated by" to describe the position of a layer with respect to other layers, we refer to the layer as being positioned between two other layers but not necessarily contiguous to or adjacent to either layer.

The terms "about" or "approximately" with reference to a numerical value or a shape means +/− five percent of the numerical value or property or characteristic, but expressly includes the exact numerical value. For example, a viscosity of "about" 1 Pa-sec refers to a viscosity from 0.95 to 1.05 Pa-sec, but also expressly includes a viscosity of exactly 1 Pa-sec. Similarly, a perimeter that is "substantially square" is intended to describe a geometric shape having four lateral edges in which each lateral edge has a length which is from 95% to 105% of the length of any other lateral edge, but which also includes a geometric shape in which each lateral edge has exactly the same length.

The term "substantially" with reference to a property or characteristic means that the property or characteristic is exhibited to a greater extent than the opposite of that property or characteristic is exhibited. For example, a substrate that is "substantially" transparent refers to a substrate that transmits more radiation (e.g. visible light) than it fails to transmit (e.g. absorbs and reflects). Thus, a substrate that transmits more than 50% of the visible light incident upon its surface is substantially transparent, but a substrate that transmits 50% or less of the visible light incident upon its surface is not substantially transparent.

As used in this specification and the appended embodiments, the singular forms "a", "an", and "the" include plural referents unless the content clearly dictates otherwise. Thus, for example, reference to fine fibers containing "a compound" includes a mixture of two or more compounds. As used in this specification and the appended embodiments, the term "or" is generally employed in its sense including "and/or" unless the content clearly dictates otherwise.

As used in this specification, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

By definition, the total of weight percentages of the total of all ingredients in a composition equals 100 weight percent.

Various exemplary embodiments of the disclosure will now be described. Exemplary embodiments of the present disclosure may take on various modifications and alterations without departing from the spirit and scope of the present disclosure. Accordingly, it is to be understood that the embodiments of the present disclosure are not to be limited to the following described exemplary embodiments but is to be controlled by the limitations set forth in the claims and any equivalents thereof.

There are a wide variety of applications where it is desired to dispose an optical film on or in an optical assembly. For example, a display may utilize a polarizing beam splitter (PBS) where an optical film is disposed on a hypotenuse of a prism. The optical film may be a multilayer polymeric optical film reflecting or transmitting light primarily by optical interference. As another example, a display system may utilize a folded optics system including a partial reflector and a reflective polarizer disposed adjacent to and spaced apart from one another as described in U.S. Pat. No. 9,557,568 (Ouderkirk et al.), for example. In some cases, it is desired to dispose the reflective polarizer on a major surface of a lens.

Thus, in exemplary embodiments, the present disclosure provides a shaped optical assembly comprising an encapsulated multilayer optical film. An optical assembly blank is insert molded directly onto a first hard-coat film preform using a first flowable material, wherein the optical assembly blank includes a multilayer optical film preform insert molded onto a second hard-coat film preform using a second flowable material.

The multilayer optical film preform includes a multilayer optical film that is encapsulated by the first and second flowable materials. Preferably, the shaped optical assembly has a maximum thickness of 3 mm, 2.9 mm, 2.8 mm, 2.7 mm, 2.6 mm, 2.5 mm or less; and. Preferably the first and/or second flowable materials comprise one or more polycarbonate resins. Preferably first and second hard-coat film preforms each include a (copolymeric) substrate comprised of one or more polycarbonate resins.

The first and second hard-coat film preforms each include a (co)polymeric substrate, preferably a polycarbonate substrate, having two opposed major surfaces and an at least partially cured hard coat layer on at least one of the opposed surfaces.

The at least partially cured hard coat layer is formed by at least partially curing a curable hard coat composition including: (a) 70 to 96 weight percent of at least one urethane (meth)acrylate compound having an average (meth)acrylate functionality of 2 to 9.5 based on the total weight of components (a) to (d); (b) 2 to 20 weight percent of at least one (meth)acrylate monomer having a (meth)acrylate functionality of 1 to 2, based on the total weight of components a) to d), optionally wherein the (meth)acrylate monomer does not comprise a urethane (meth)acrylate compound or a silicone (meth)acrylate; (c) an optional 0.5 to 2 weight percent of at least one silicone (meth)acrylate, based on the total weight of components (a) to (d); (d) an optional effective amount of at least one photoinitiator; (e) an optional plurality of inorganic nanoparticles and (f) optionally, at least one solvent.

In some presently preferred embodiments, the optical assembly is injection molded so that a diffusion bond forms between the MOF, the first and second hard-coat films, and the first and second flowable materials used to form the optical assembly. In some embodiments, the diffusion bond is stronger than an interlayer bond between adjacent layers in the optical film. In some embodiments, the optical assembly resulting from the insert molding process has an optical birefringence of less than 10 nm and in some embodiments, the optical birefringence varies more along one direction than along an orthogonal direction.

Exemplary embodiments of the present disclosure provide a shaped optical assembly comprising an optical assembly blank that is insert molded directly onto a first hard-coat film preform using a first flowable material, wherein the optical assembly blank comprises a multilayer optical film preform insert molded onto a second hard-coat film preform using a second flowable material. The multilayer optical film preform comprises a multilayer optical film that is encapsulated by the first and second flowable materials and the first and second hard-coat film preforms.

Flowable Materials

First and second flowable materials are used in the injection molding processes to encapsulate the multilayer optical film. Preferably the first and/or second flowable materials comprise one or more (co)polymers. Suitable (co)polymers include polymethylmethacrylate (PMMA), polycarbonate, polystyrene, cyclic olefin, and polyethylene terephthalate (PET).

Preferably the first and/or second flowable materials comprise one or more polycarbonate resins. Suitable polycarbonate resins are commercially available and are known to those skilled in the art. Presently preferred polycarbonate resins are sold under the trade name "Makrolon" by Covestro LLC (Pittsburgh, PA). One presently-preferred polycarbonate resin is Makrolon 3107.

The first and second flowable materials may be the same resin composition or a different resin composition. It is currently preferred to use the same resin composition for the first and second flowable material.

Film Preforms

Optical assemblies according to exemplary embodiments of the present disclosure may be advantageously prepared using a shaped film preform. Turning now to the drawings, FIG. 1 is a schematic cross-sectional view of an exemplary film preform 100 useful in forming an optical assembly including an encapsulated multilayer optical film according to exemplary embodiments of the present disclosure. The exemplary shaped film preform 100 includes an upper major surface 120 overlaying a lower major surface 125. The shaped film preform 100 has a radius of curvature 130 and a maximum depth 140.

Upper major surface 120 is disposed against a female mold surface during thermoforming, and hence is disposed on the convex surface of the shaped film preform 100.

A shaped film preform 100 may be prepared by thermoforming using a female mold. The shaped preform 100 may comprise a polycarbonate film and/or an MOF. Thermoforming is a manufacturing process whereby a plastic film is heated to a pliable forming temperature, formed to a specific shape in a mold (also mold insert or mold block), and trimmed to create a usable product. In practice, a mold having a desired mold shape is mounted to a thermoforming apparatus. A suitable thermoforming apparatus is available from Hy-Tech Forming Systems USA, Inc. (Phoenix, AZ). The thermoforming apparatus preferably has an upper platen and a lower platen, each of which is curved to match the curvature shape of a desired optical assembly.

According to various embodiments of the present disclosure, a female mold having a concave mold surface is used. The abrasion-resistant multilayer optical film is heated to a high-enough temperature that permits it to be stretched into the mold and cooled to a finished shape. Its simplified version is vacuum forming. Suitable thermoforming techniques are well known to those of skill in the art.

The female mold consists of a recessed cavity or cavities formed in a mold block. This is the most common mold form because it is easy to clamp the heated sheet across the unobstructed mold face. The resulting product has a clearly defined male form and an imprecise female form. Often the simplicity of the female mold outweighs the cosmetic requirements of the product, so that it is common to see packaging products such as nest-type box liners in which the recessed presentation face is the imprecise second surface.

The female mold has at least one radius of curvature (e.g., a spherical radius of curvature, a cylindrical radius of curvature, or a toric radius of curvature) in the range of 58 to 76 millimeters (mm), in some embodiments 65 to 68 mm, and in some preferred embodiments 66 to 67 mm. In addition, the region with the foregoing radius of curvature has a maximum depth of 13 to 20 mm, in some embodiments, 15 to 20 mm, or even 18 to 19 mm.

Typically, the cross-section will be parallel to the thickness dimension of the mold, although this is not a requirement. In some embodiments, a spherical radius of curvature is preferred.

It is often advantageous in thermoforming to pre-stretch the heated sheet immediately prior to forming it in the mold. There are two principal reasons for this. First, particularly when simple vacuum forming is combined with solid phase forming, the available force may be insufficient to stretch and form the sheet efficiently. A second reason is that some shapes, for example cup or box forms of relatively high aspect ratio, give rise to excessive variations in wall thickness when formed without pre-stretch. This arises because the sheet touches down first on the edges and side walls of the mold cavity and then perhaps in the center of the base. The combined mechanisms of chilling and friction tend to anchor the sheet in these positions so that all the remaining deformation needed to complete the forming is contributed by a minor proportion of the sheet area. In this case, the remedy may be selective pre-stretching in a manner related to the geometry of the mold form.

Selective pre-stretching is achieved by means of specially shaped plugs which are mechanically advanced into the heated sheet to produce local stretching in a way calculated to counteract the thinning tendency imposed by the mold geometry. The technique is generally referred to as plug assist. The plug shape exerts a considerable influence on wall thickness variation. Plug design is as much an art as a science. A blunt-nosed plug tends to produce articles with a thick base and thinner sidewalls. Tapered can-like plugs, on the other hand, produce a forming with thicker and stronger corners. Plug design must be optimized for each individual application but the general rule is for smooth surfaces and blended shapes without sharp transitions in form. The coefficient of friction for heated polypropylene sheet is relatively high, so plugs should be made from low-friction materials. The usual choices are polyamide, PTFE, or filled epoxy resins.

When the sheet pre-stretch is to be generalized over the whole sheet rather than localized in the area of individual mold features, the effect is achieved either by partial vacuum or positive air pressure. In both cases, a low-pressure differential and a controlled flow rate is employed to inflate the sheet without causing excessive thinning or rupture. Pre-stretch by positive air pressure is often referred to as billow. The air pressure is sometimes generated by the piston effect, produced by advancing a mold towards the sheet. This pre-stretch technique is generally known as air slip. Some processes combine plug and billow pre-stretch techniques.

All forms of pre-stretch tend to modify orientation in the formed part. When forming is performed without pre-stretch, the orientation depends very much on the mold form geometry. Clearly, the situation is complex, but the tendency is for uniaxial orientation to predominate in the product sidewalls, while biaxial orientation is prevalent in regions that remain substantially parallel to the plane of the original sheet. These patterns are superimposed on whatever residual orientation remains in the sheet after heating. Pre-stretch changes the picture somewhat. The billow process imposes an overall biaxial orientation on the sheet which is later modified by the forming process. Plug pre-stretch, on the other hand, tends to emphasize the orientation patterns arising from forming.

Hard-coats on thermoplastic films (e.g., polycarbonate substrates, MOFs) may be assessed for their thermoformability by thermoforming them with a female mold having an 8 base lens shape (a spherical radius of curvature 66.25 millimeters and a maximum depth of 18.5 millimeters) and determining the amount of cracking of the hard-coat from the center of the lens shape to the edges of the lens shape. Preferred embodiments exhibit no cracking anywhere on the lens shape. If the coating on the lens shape cracks, the crack usually starts at the center. For example, if a crack starts at the center and continues 20% of the distance between the center and the edge of the lens shape, then cracking is reported as 20% from the center. Once a lens shape is thermoformed, generally there is no further cracking when this lens shape is used in further molding operations.

Multilayer Optical Films

Figure 2:
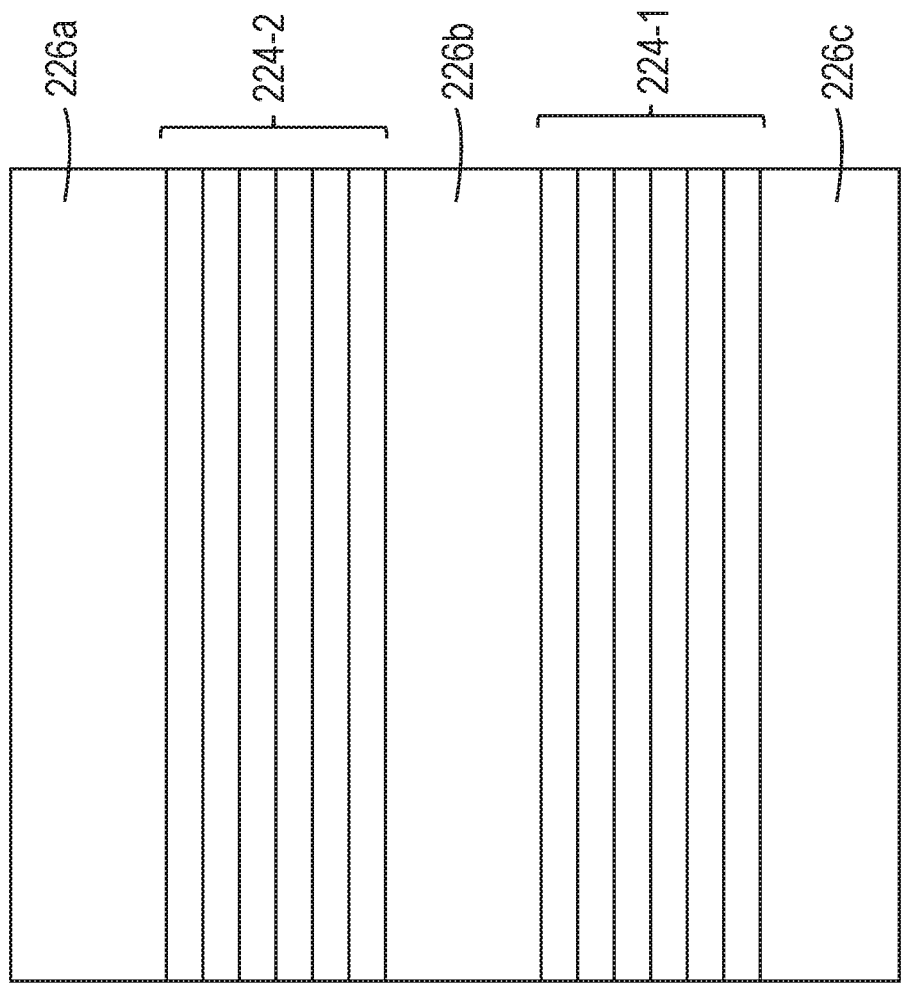
FIG. 2 is a schematic cross-sectional view of an exemplary multilayer optical film suitable for encapsulation within an optical assembly according to exemplary embodiments of the present disclosure.

FIG. 2 is a schematic cross-sectional view of an exemplary film suitable for encapsulation within an optical assembly according to exemplary embodiments of the present disclosure. FIG. 2 illustrates a multilayer optical film (MOF) 250, which can be used in a shaped film preform 100 as shown in FIG. 1. MOF 250 may include first and second packets 224-1 and 224-2 of interference layers separated by noninterference layer 226b. The MOF 250 may further include outer noninterference layers 226a and 226c. MOF 250 may be integrally formed.

The optical film 250 may include a plurality of interference layers 224 and noninterference layers 226a and 226b. The plurality of interference layers 224 include alternating first and second polymeric layers 221 and 223. The plurality of interference layers 224 reflect or transmit light primarily by optical interference. Interference layers can be described as reflecting or transmitting light primarily by optical interference when the reflectance and transmittance of the interference layers can be reasonably described by optical interference or reasonably accurately modeled as resulting from optical interference.

Such interference layers are described in U.S. Pat. No. 5,882,774 (Jonza et al.), and U.S. Pat. No. 6,609,795 (Weber et al.), for example, and can be made by coextruding a melt stream having alternating polymeric layers, casting the melt stream to form a cast film, and then orienting (biaxially for mirror films and substantially uniaxially for reflective polarizer films) the cast film to produce birefringent layers (e.g., every other layer in the interference layers can be birefringent, while every other layer remains substantially isotropic) as is known in the art.

Adjacent pairs of interference layers having differing refractive indices reflect light when the pair has a combined optical thickness (refractive index times physical thickness) of ½ the wavelength of the light. Interference layers typically have a physical thickness of less than about 200 nanometers. Noninterference layers have an optical thickness too large to contribute to the reflection of visible light via interference.

Typically, noninterference layers have a physical thickness of at least 1 micrometer, or at least 3 times a predetermined wavelength, or at least 3 times a largest wavelength in a predetermined range. In some embodiments, more than one noninterference layer is included. In some embodiments, at least one noninterference layer (noninterference layer 226a and 226b in the illustrated embodiment) is integrally formed with the plurality of interference layers 224 and does not reflect or transmit light primarily by optical interference.

The first and second packets 224-1 and 224-2 may use overlapping thickness ranges as described in U.S. Prov. Pat. Appl. 62/467,712 filed Mar. 6, 2017 and titled "High Contrast Optical Film and Devices Including the Same", for example, to provide a reflective polarizer with a high contrast ratio (ratio of pass state transmittance to block state transmittance) or a mirror with a low leakage.

In some embodiments, a reflective polarizer utilizing packets with overlapping thickness ranges, for example, has a block state reflectance of at least 99%, or at least 99.5%, or at least 99.8%. In some embodiments, MOF 250 has a reflectance greater than about 80% for normally incident light having a predetermined wavelength and a same first polarization state. In some embodiments, even after MOF 250 including MOF 250 is thermoformed into a curved shape to form a preform 100 or an optical assembly including MOF 250 or other optical films of the present disclosure is molded, MOF 250 still exhibits a high reflectivity.

For example, in some embodiments, each location over at least about 80%, or at least about 90%, or all of a total area of the optical film has a reflectance greater than about 80%, or greater than about 90% for normally incident light having a same predetermined wavelength and a same first polarization state.

MOF 250 may also exhibit a low leakage even after being formed and having an optical assembly molded onto the optical film. For example, in some embodiments, each location over at least about 80%, or at least about 90%, or all of a total area of the optical film has a transmittance less than about 5%, or less than about 2%, or less than about 1%, or less than about 0.6%, or less than about 0.5% for normally incident light having the same predetermined wavelength and the same first polarization state.

In some embodiments, MOF 250 is a reflective polarizer substantially reflecting normally incident light having a predetermined wavelength and a block polarization state and substantially transmitting normally incident light having the predetermined wavelength and an orthogonal pass polarization state. In some embodiments, each location over at least about 80%, or at least about 90%, or all of a total area of the reflective polarizer has a transmittance of less than about 5%, or less than about 2%, or less than about 1%, or less than about 0.6%, or less than about 0.5% for normally incident light having the predetermined wavelength and the block polarization state.

Infrared-reflecting multilayer optical films are well known and can be made according to known methods or obtained from commercial suppliers such as, for example, 3M Company, St. Paul, Minnesota Multilayer optical films (including reflective polarizers and mirrors) can be made by coextrusion of alternating polymer layers having different refractive indices, for example, as described in U.S. Pat. No. 5,882,774 (Jonza et al.); U.S. Pat. No. 6,045,894 (Jonza et al.); U.S. Pat. No. 6,368,699 (Gilbert et al.); U.S. Pat. No. 6,531,230 (Weber et al.); U.S. Pat. No. 6,667,095 (Wheatley et al.); U.S. Pat. No. 6,783,349 (Neavin et al.); U.S. Pat. No. 7,271,951 B2 (Weber et al); U.S. Pat. No. 7,632,568 (Padiyath et al.); and U.S. Pat. No. 7,652,736 (Padiyath et al.); U.S. Pat. No. 7,952,805 (McGurran et al.); and PCT Publications WO 95/17303 (Ouderkirk et al.) and WO 99/39224 (Ouderkirk et al.). In some embodiments, the MOF is at least 30, 40, 50, 60, 70, 80, or even at least 90 percent reflective to wavelengths in the range 400 nm to 700 nm (visible-light-reflective) or 700 nm to at least 1500 nm (infrared-light-reflective), and more preferably 700 nm to 2500 nm (infrared light-reflective), although this is not a requirement.

Hard-Coat Films with Curable Hard-Coat Compositions

The first and second hard-coat films each comprise a (co)polymeric substrate having two opposed major surfaces and an at least partially cured hard coat layer on at least one of the opposed surfaces. Preferably the first and second hard-coat films each include a (co)polymeric substrate comprising one or more polycarbonate resins.

The first and second hard-coat film substrates each have two opposed major surfaces and an at least partially cured hard coat layer on at least one of the opposed surfaces. The at least partially cured hard coat layer is formed by at least partially curing a curable hard coat composition including: (a) 70 to 96 weight percent of at least one urethane (meth) acrylate compound having an average (meth)acrylate functionality of 2 to 9.5 based on the total weight of components (a) to (d); (b) 2 to 20 weight percent of at least one (meth)acrylate monomer having a (meth)acrylate functionality of 1 to 2, based on the total weight of components a) to d), preferably wherein the (meth)acrylate monomer does not comprise a urethane (meth)acrylate compound or a silicone (meth)acrylate; (c) an optional 0.5 to 2 weight percent of at least one silicone (meth)acrylate, based on the total weight of components (a) to (d); (d) an optional effective amount of at least one photoinitiator; (e) an optional plurality of inorganic nanoparticles and (f) optionally, at least one solvent.

Such curable compositions are described further in U.S. Prov. Pat. App. No. 62/549,082 filed on Dec. 16, 2016, titled "Infrared-Reflecting Optically Transparent Assembly and Method of Making the Same" and hereby incorporated herein by reference to the extent that it does not contradict the present description. The composition can be coated onto the optical film and then cured prior to forming (e.g., thermoforming) the optical film into the desired shape.

If solvent is present, the coated curable composition is optionally (but typically) at least partially dried to provide an at least partially dried curable composition. The curable composition, or the at least partially dried curable composition, is then at least partially cured to provide the shaped abrasion-resistant multilayer optical film.

Urethane (Methacrylate) Compound

The curable hard-coat composition comprises 70 to 96 wt %, more preferably 75 to 90 wt %, or even 80 to 85 wt %, of at least one urethane (meth)acrylate compound having an average (meth)acrylate functionality of 1 to 9.5, 2 to 9.5, 2 to 6 or even 2 to 4.8 based on the total weight of the urethane (meth)acrylate, (meth)acrylate monomers, optional silicone (meth)acrylate and optional photoinitiator.

The urethane (meth)acrylate compounds contribute to the conformability and flexibility of the cured composition, and hence its suitability for thermoforming. Exemplary urethane (meth)acrylate compounds having an average (meth)acrylate functionality of 2 to 9 are available from commercial sources, and/or can be prepared according to known methods described further below. In some embodiments, the urethane (meth)acrylate compounds having an average (meth)acrylate functionality of 2 to 4.3, 2.3 to 4.3, or even 2.5 to 4.1.

The urethane (meth)acrylate compound may be a pure compound or a mixture of pure compounds. In some instances, urethane (meth)acrylate compounds with higher and lower average (meth)acrylate functionalities may be combined to achieve an average (meth)acrylate functionality of 2 to 4.8, or another desired value.

In some embodiments, the urethane (meth)acrylate compound comprises a reaction product of a biuret adduct of hexamethylene diisocyanate (HDI) or a isocyanurate adduct of HDI with hydroxyethyl acrylate or a combination of hydroxyethyl acrylate and pentaerythritol triacrylate that has an average (meth)acrylate functionality of 3.5 to 4.8.

In some embodiments, the urethane (meth)acrylate compound comprises a reaction product of a biuret adduct of hexamethylene diisocyanate (HDI) or a isocyanurate adduct of HDI with hydroxyethyl acrylate or a combination of hydroxyethyl acrylate and pentaerythritol triacrylate that has an average (meth)acrylate functionality of 3.5 to 4.8, and a molecular weight of 1100 g/mole to 1300 g/mole.

In some embodiments, the urethane (meth)acrylate compound comprises a reaction product of a biuret adduct of hexamethylene diisocyanate (HDI) or a isocyanurate adduct of HDI with hydroxyethyl acrylate or a combination of hydroxyethyl acrylate and pentaerythritol triacrylate that has an average (meth)acrylate functionality of 3.5 to 4.8, a molecular weight of 1100 g/mole to 1300 g/mole, and an acrylate equivalent weight of 307 g/equivalent to 275 g/equivalent.

Exemplary urethane (meth)acrylate compounds having an average (meth)acrylate functionality of 3 to 9 are available from commercial sources, and/or can be prepared according to known methods. Commercially available urethane (meth) acrylate compounds include EBECRYL 264 aliphatic urethane triacrylate, EBECRYL 265 aliphatic urethane triacrylate, EBECRYL 1258 aliphatic urethane triacrylate, EBECRYL 4100 aliphatic urethane triacrylate, EBECRYL 4101 aliphatic urethane triacrylate, EBECRYL 8412 aliphatic urethane acrylate (trifunctional), EBECRYL 4654 aliphatic urethane triacrylate, EBECRYL 4666 aliphatic urethane triacrylate, EBECRYL 4738 aliphatic allophanate urethane triacrylate, EBECRYL 4740 aliphatic allophanate urethane triacrylate, EBECRYL 8405 aliphatic urethane tetraacrylate, EBECRYL 8604 aliphatic urethane tetraacrylate, EBECRYL 4500 aromatic urethane tetraacrylate, EBECRYL 4501 aromatic urethane tetraacrylate, EBECRYL 4200 aliphatic urethane tetraacrylate, EBECRYL 4201 aliphatic urethane tetraacrylate, EBECRYL 8702 aliphatic urethane hexaacrylate, EBECRYL 220 aromatic urethane hexaacrylate, EBECRYL 221 aromatic urethane hexaacrylate, EBECRYL 2221 aromatic urethane hexaacrylate, EBECRYL 2221 aromatic urethane hexaacrylate, EBECRYL 5129 aliphatic urethane hexaacrylate, EBECRYL 1290 aliphatic urethane hexaacrylate, EBECRYL 1291 aliphatic urethane hexaacrylate, EBECRYL 8301-R aliphatic urethane hexaacrylate, EBECRYL 8602 aliphatic urethane acrylate (nonfunctional), all from Allnex, Brussels, Belgium; and CN929 trifunctional urethane acrylate and CN9006 aliphatic urethane acrylate (hexafunctional) from Sartomer Co., Exton, Pennsylvania In some embodiments, urethane (meth)acrylate compound(s) can be synthesized by reacting a polyisocyanate compound with a hydroxyl-functional (meth)acrylate compound. A variety of polyisocyanates may be utilized in preparing the urethane (meth)acrylate compound. As used herein, the term "polyisocyanate" means any organic compound that has two or more reactive isocyanate (—NCO) groups in a single molecule such as, for example, diisocyanates, triisocyanates, tetraisocyanates, and mixtures thereof. For improved weathering and diminished yellowing, the urethane (meth)acrylate compound(s) employed herein are preferably aliphatic and therefore derived from an aliphatic polyisocyanate.

In some preferred embodiments, the urethane (meth) acrylate compound is preferably a reaction product of hexamethylene diisocyanate (HDI), such as available from Covestro LLC, Pittsburgh, Pennsylvania as DESMODUR H, or a derivative thereof. These derivatives include, for example, polyisocyanates containing biuret groups, such as the biuret adduct of hexamethylene diisocyanate (HDI) available from Covestro LLC as DESMODUR N-100, polyisocyanates containing one or more isocyanurate rings

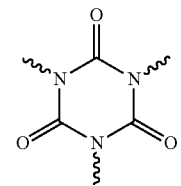

such as that available from Covestro LLC as DESMODUR N-3300, as well as polyisocyanates containing urethane groups, uretdione groups, carbodiimide groups, and/or allophanate groups. Yet another useful derivative, is a hexamethylene diisocyanate (HDI) trimer, available from Covestro LLC as DESMODUR N-3800. These derivatives are preferred as they are polymeric, exhibit very low vapor pressures and are substantially free of isocyanate monomer.

In some embodiments, urethane (meth)acrylate compound(s) is/are the reaction product(s) of a polyisocyanate such as a hexamethylene diisocyanate (HDI) derivative having an —NCO (i.e., isocyanate group) content of at least 10 percent, at least 15 percent, or even at least 20 weight percent. In some cases, HDI or other polyisocyanate may be reacted with hydroxyl-functional (meth)acrylate compounds and polyols. The —NCO content of the polyisocyanate is preferably not greater than 50 weight percent. On some embodiments, the polyisocyanate typically has an equivalent weight of at least 80, 100, 120, 140, 160, 180, or even 200 grams/per —NCO group. The equivalent weight is typically no greater than 500, 450, or 400 grams/per —NCO group and in some embodiments no greater than 350, 300, or 250 grams/per —NCO group, although this is not a requirement.

When aliphatic polyisocyanates comprising a cyclic group such as an isophorone diisocyanate (IPDI) derivative are used, the resulting cured composition can be less flexible (e.g., have poor thermoformability) and poor abrasion resistance.

The polyisocyanate is reacted with a hydroxyl-functional acrylate compound having the formula HOQ(A)$_p$; wherein Q is a divalent organic linking group, A is a (meth)acryl functional group —XC(=O)C(R$_2$)=CH$_2$ wherein X is O, S, or NR wherein R is H or C$_1$-C$_4$ alkyl, R$_2$ is a lower alkyl of 1 to 4 carbon atoms or H; and p is 1 to 6. The —OH group reacts with the isocyanate group forming a urethane linkage.

In some embodiments, the polyisocyanate can be reacted with a diol acrylate, such as a compound of the formula HOQ(A)Q$_1$Q(A)OH, wherein Q$_1$ is a divalent linking group and A is a (meth)acryl functional group as previously described. Representative compounds include hydantoin hexaacrylate (HHA) (e.g., see Example 1 of U.S. Pat. No. 4,262,072 (Wendling et al.), and H$_2$C=C(CH$_3$)C(=O)OCH$_2$CH(OH)CH$_2$O(CH$_2$)$_4$OCH$_2$CH(OH)CH$_2$OC(=O)C(CH$_3$)=CH$_2$.

Q and Q$_1$ are independently a straight or branched chain or cycle-containing connecting group. Q can, for example, include a covalent bond, alkylene, arylene, aralkylene, or alkarylene. Q can optionally include heteroatoms such as O, N, and S, and combinations thereof. Q can also optionally include a heteroatom-containing functional group such as carbonyl or sulfonyl, and combinations thereof. In one embodiment, the hydroxyl-functional acrylate compounds used to prepare the urethane (meth)acrylate compound are monofunctional, such as in the case of hydroxyethyl acrylate, hydroxybutyl acrylate, and caprolactone monoacrylate, available as SR-495 from Sartomer Co. In this embodiment, p is 1.

In another embodiment, the hydroxyl-functional acrylate compounds used to prepare the urethane (meth)acrylate compound are multifunctional, such as the in the case of glycerol dimethacrylate, 1-(acryloxy)-3-(methacryloxy)-2-propanol, pentaerythritol triacrylate. In this embodiment, p is at least 2, at least 3, at least 4, at least 5, or at least 6.

In some embodiments, only monofunctional hydroxyl-functional acrylate compounds are utilized in the preparation of the urethane (meth)acrylate compound. In other embodiments, a combination of monofunctional and multifunctional hydroxyl-functional acrylate compounds are utilized in the preparation of the urethane (meth)acrylate compound. In some embodiments, the weight ratio of monofunctional hydroxyl-functional acrylate compound(s) to multifunctional hydroxyl-functional acrylate compound(s) ranges from 0.5:1 to 1:0.5. When the urethane (meth)acrylate compound is prepared from only multifunctional hydroxyl-functional acrylate compound(s), in some embodiments the resulting cured composition can be less flexible.

In some embodiments, some of the isocyanate groups on the polyisocyanate can be reacted with a polyol such as, for example, an alkoxylated polyol available from Perstorp Holding AB, Sweden as Polyol 4800. Such polyols can have a hydroxyl number of 500 to 1000 mg KOH/g and a molecular weight ranging from at least 200 or 250 g/mole up to 500 g/mole.

In some embodiments, some of the isocyanate groups on the polyisocyanate can be reacted with a polyol such as 1,6-hexanediol.

Selection of reaction conditions used to react the polyisocyanate with (meth)acrylated alcohols, and choice of catalyst if any, will be apparent to those of skill in the art. Further examples can be found in the Examples section hereinbelow.

The average (meth)acrylate functionality is calculated in the following fashion. The functionality of the added acrylates for each compound is first calculated. For instance, a composition may include 1.0 equivalent of DESN100 (DESMODUR N100 biuret-based hexamethylene diisocyanate oligomer, 100% solids, 22.0 wt. % NCO, 191 g/eq., available from Covestro LLC, Pittsburgh, Pennsylvania), 0.25 equivalents of HEA (2-hydroxyethyl acrylate, available from Alfa Aesar, Tewksbury, Massachusetts), and 0.75 equivalents of PET3A (pentaerythritol triacrylate, available from Sartomer Co., Exton, Pennsylvania, as SR444C). This means that the compound is the reaction product of 1 equivalent of isocyanate groups (as DESN100) and 0.25 hydroxyl equivalents of hydroxyethyl acrylate and 0.75 hydroxyl equivalents of PET3A. The HEA has 1 acrylate group per hydroxyl group and the PET3A has 3 acrylate groups per hydroxyl group. The functionality of added acrylates for this compound is then (0.25*1)+(0.75*3) or 2.5. The average (meth)acrylate functionality is found by multiplying the functionality of the added acrylates for each compound by the average functionality of the polyisocyanate. According to Covestro, the average functionality for DESN100 is 3.6, so the average (meth)acrylate functionality for the compound is at 2.5*3.6 or 9. Other estimated average functionality of polyisocyanates for DESN3300, DESN3800, and DESZ4470BA are 3.5, 3.0, and 3.3 respectively.

In some embodiments, some of the isocyanate groups on the polyisocyanate can be reacted with a polyol such as, for example, an alkoxylated polyol available from Perstorp Holding AB, Sweden as Polyol 4800. Such polyols can have a hydroxyl number of 500 to 1000 mg KOH/g and a molecular weight ranging from at least 200 or 250 g/mole up to 500 g/mole.

In some embodiments, some of the isocyanate groups on the polyisocyanate can be reacted with a polyol such as 1,6-hexanediol.

Selection of reaction conditions used to react the polyisocyanate with (meth)acrylated alcohols, and choice of catalyst, if any, will be apparent to those of skill in the art.

(Meth)Acrylate Monomers

The curable hard-coat composition comprises 2 to 20 wt %, 2.5 to 15 wt %, or even 3 to 12.5 wt % of at least one (meth)acrylate monomer having a (meth)acrylate functionality of 1 to 2, based on the total weight of the urethane (meth)acrylate, (meth)acrylate monomers, optional silicone (meth)acrylate and optional photoinitiator. Preferably, the (meth)acrylate monomers do not comprise a urethane (meth)acrylate compound and/or a silicone (meth)acrylate compound.

Useful (meth)acrylate monomers (which are preferably non-urethane, and preferably non-silicone, although this is not a requirement) have a (meth)acrylate functionality of 1 to 2. These monomers may function as diluents or solvents, as viscosity reducers, as binders when cured, and as cross-linking agents, for example. Examples of useful (meth) acrylates include mono(meth)acrylates such as octyl (meth) acrylate, nonylphenol ethoxylate (meth)acrylate, isononyl (meth)acrylate, isobornyl (meth)acrylate, 2-(2-ethoxy-ethoxy)ethyl (meth)acrylate, 2-ethylhexyl (meth)acrylate, lauryl (meth)acrylate, beta-carboxyethyl (meth)acrylate, isobutyl (meth)acrylate, 2-hydroxyethyl (meth)acrylate, isodecyl (meth)acrylate, dodecyl(meth)acrylate, n-butyl (meth) acrylate, methyl (meth)acrylate, hexyl (meth)acrylate, (meth)acrylic acid, stearyl (meth)acrylate, hydroxy functional caprolactone ester (meth)acrylate, isooctyl (meth) acrylate, hydroxymethyl (meth)acrylate, hydroxypropyl (meth)acrylate, hydroxyisopropyl (meth)acrylate, hydroxybutyl(meth)acrylate, hydroxyisobutyl (meth)acrylate, tetrahydrofurfuryl (meth)acrylate, and alkoxylated versions of the above (meth(acrylate monomers, such as alkoxylated tetrahydrofurfuryl (meth)acrylate and combinations thereof. Tetrahydrofurfuryl (meth)acrylate is preferred in some embodiments; di(meth)acrylates such as 1,6-hexanediol di(meth)acrylate, poly(ethylene glycol) di(meth)acrylates, polybutadiene di(meth)acrylates, polyurethane di(meth) acrylates, ethylene glycol di(meth)acrylate, hexanediol di(meth)acrylate, diethylene glycol di(meth)acrylate, triethylene glycol di(meth)acrylate, tetraethylene glycol di(meth) acrylate, neopentyl glycol di(meth)acrylate, alkoxylated versions of the above di(meth)acrylates, and combinations thereof. Of these, 1,6-hexanediol diacrylate is preferred in some embodiments. (Meth)acrylate monomers having a functionality of 1 or 2 (e.g., as listed above) are widely commercially available.

Optional Silicone (Meth)Acrylates

Optionally, the curable hard-coat composition comprises 0.5 to 2 weight percent of at least one silicone (meth)acrylate based on the total weight of the urethane (meth)acrylate, (meth)acrylate monomers, optional silicone (meth)acrylate and optional photoinitiator.

Exemplary useful silicone (meth)acrylates include mono- and polyfunctional silicone (meth)acrylates. Of these, silicone poly(meth)acrylates may be preferred because the likelihood of unbound silicone (meth)acrylate after curing is generally reduced. Exemplary silicone (meth)acrylates include EBECRYL 350 silicone diacrylate and EBECRYL 1360 silicone hexaacrylate from Allnex, CN9800 aliphatic silicone acrylate and CN990 siliconized urethane acrylate compound from Sartomer Co., and TEGO RAD 2100, TEGO RAD 2250, and TEGO RAD 2500 silicone polyether acrylate from Evonik Industries, Parsippany, New Jersey Optional Photoinitiator The curable composition may optionally, but preferably, further comprise an effective amount of at least one photoinitiator. By the term "effective amount" is meant an amount that is at least sufficient amount to cause curing of the curable composition under ambient conditions. Typically, effective amounts of photoinitiator comprise less than 10 percent by weight, more typically less than 7 percent by weight, and more typically less than 3 percent by weight of the total curable composition. It will be recognized that curing may be complete even though polymerizable (meth) acrylate groups remain.

Exemplary photoinitiators include α-cleavage photoinitiators such as benzoin and its derivatives such as α-methylbenzoin; α-phenylbenzoin; α-allylbenzoin; α-benzylbenzoin; benzoin ethers such as benzil dimethyl ketal (available as IRGACURE 651 from Ciba Specialty Chemicals, Tarrytown, New York), benzoin methyl ether, benzoin ethyl ether, benzoin n-butyl ether; acetophenone and its derivatives such as 2-hydroxy-2-methyl-1-phenyl-1-propanone (available as DAROCUR 1173 from Ciba Specialty Chemicals) and 1-hydroxycyclohexyl phenyl ketone (available as IRGACURE 184 from Ciba Specialty Chemicals); 2-methyl-1-[4-(methylthio)phenyl]-2-(4-morpholinyl)-1-propanone (available as IRGACURE 907 from Ciba Specialty Chemicals); 2-benzyl-2-(dimethylamino)-1-[4-(4-morpholinyl)phenyl]-1-butanone (available as IRGACURE 369 from Ciba Specialty Chemicals); titanium complexes such as bis(η5-2,4-cyclopentadien-1-yl)bis[2,6-difluoro-3-(1H-pyrrol-1-yl)phenyl] titanium (available as CGI 784 DC from Ciba Specialty Chemicals); and mono- and bis-acylphosphines (available from Ciba Specialty Chemicals as IRGACURE 1700, IRGACURE 1800, IRGACURE 1850, and DAROCUR 4265). One useful photoinitiator, a difunctional alpha hydroxyketone, is available as ESACURE ONE from Lamberti S.p.A, Albizzate, Italy.

If an acylphosphine or acylphosphine oxide photoinitiator is utilized, it is typically combined with a photoinitiator (e.g., 2-hydroxy-2-methyl-1-phenyl-1-propanone) having a high extinction coefficient at one or more wavelengths of the actinic radiation. Such combination typically facilitates surface cure while maintaining low levels of costly photoinitiator.

Other useful photoinitiators include: anthraquinones (e.g., anthraquinone, 2-ethylanthraquinone, 1-chloroanthraquinone, 1,4-dimethylanthraquinone, 1-methoxyanthraquinone) and benzophenone and its derivatives (e.g., phenoxybenzophenone, phenylbenzophenone).

Optional Inorganic Nanoparticles

In some embodiments, the curable composition further includes a plurality of nanoparticles. Suitable nanoparticles include metal oxide nanoparticles such as silica (silicon oxide) alumina (aluminum oxide), titania (titanium oxide), zirconia (zirconium oxide), indium tin oxide (ITO), tin oxide, magnesium oxide, and the like. Metal nanoparticles, for example gold, silver, platinum, aluminum, titanium, tin, and the like may also be useful.

Alpha alumina metal oxide nanoparticles are currently preferred, preferably in an amount of 0.2 to 9 percent by weight (more preferably 0.2 to 3 percent by weight), based on the total weight of the curable composition.

Preferably, the alpha alumina nanoparticles have a particle size distribution with a Dv50 of from 0.05 to 1 micron. In some preferred embodiments, the alpha alumina nanoparticles have a particle size distribution with a Dv50 of 0.1 to 1 micron, 0.15 to 1 micron, 0.15 to 0.5 micron, or 0.2 to 0.3 micron. In some preferred embodiments, the alpha alumina nanoparticles have a polymodal distribution.

The alpha alumina nanoparticles comprise, preferably consist essentially of (e.g., are at least 99 weight percent), or even consist of, alumina in its alpha crystalline form. In some preferred embodiments, the alpha alumina nanoparticles have a particle size distribution with a Dv50 of greater than or equal to 0.21, 0.23, 0.25, 0.30, 0.40, or even 0.50 micron.

The alpha alumina nanoparticles can be made by milling larger size alpha alumina, for example, using a ball mill or a jet mill. If using a ball mill the milling media preferably comprises, or even consists of, alpha alumina, although other milling media such as, for example, aluminum zirconate media may be used.

Alpha alumina nanoparticles, which may even be in the size range of having a particle size distribution with a Dv50 of from 0.1 to 1 micron, can be readily obtained from commercial sources. Suppliers include US Research Nanomaterials, Inc., Houston, Texas; Sisco Research Laboratories Pvt. Ltd., Mumbai, India; and Baikowski International Corp., Charlotte, North Carolina Optional Solvent The curable composition may contain one or more optional solvents, generally organic solvents, although water/solvent blends may be used. Exemplary optional solvents include hydrocarbons or halogenated hydrocarbons (e.g., toluene, cyclohexane, petroleum ether, lower alcohols (e.g., methanol, ethanol, propanol, and isopropanol), esters of aliphatic acids (e.g., ethyl acetate), ethers (e.g., tetrahydrofuran), and ketones (e.g., acetone and methyl ethyl ketone). The solvents can be used singly or in admixture. One skilled in the art can readily determine which solvent to use, and its amount.

Optional Additives

The curable composition may also contain one or more optional additives such as, for example, fillers, thickeners, tougheners, pigments, fibers, tackifiers, lubricants, wetting agents, surfactants, antifoaming agents, dyes, coupling agents, plasticizers, and suspending agents.

The curable composition may be coated onto a major surface of the hard-coat film or an MOF by any suitable technique including, for example, spray coating, roll coating, gravure coating, slot coating, knife coating, bar coating, and dip coating. If optional solvent is present, it is typically at least partially dried by evaporation of some, or all, of the solvent (e.g., using a forced air oven or other heating means).

Next, the optionally at least partially dried, curable composition is at least partially cured, preferably fully cured to provide the shaped abrasion-resistant multilayer optical film. Curing may be accomplished using heat if the curable composition comprises a thermal initiator (e.g., a peroxide initiator), particulate radiation (e.g., e-beam), or photocuring (e.g., using ultraviolet and/or visible wavelengths of electromagnetic radiation). Techniques for such curing technologies are well-known in the art and are within the capability of the skilled artisan.

Optical Assembly Blanks

Figure 3A:
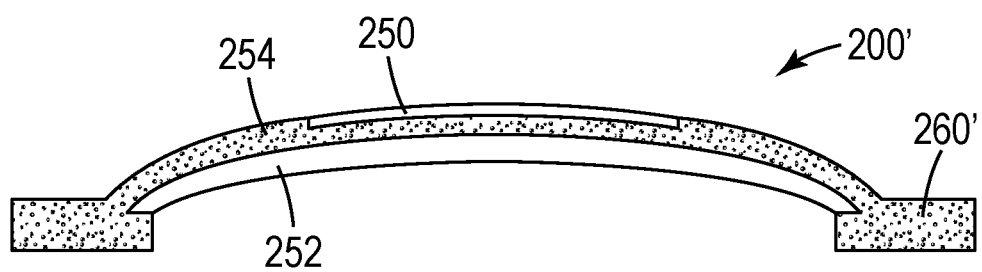
FIG. 3A is a schematic cross-sectional view of an exemplary optical assembly blank including a multilayer optical film useful in producing an optical assembly having an encapsulated multilayer optical film according to exemplary embodiments of the present disclosure.

FIG. 3A is a schematic cross-sectional view of an exemplary optical assembly blank 200' including a multilayer optical film 250, first flowable material 254, and hard-coat film 252 with an at least partially cured hard-coat composition useful in producing an optical assembly having an encapsulated multilayer optical film according to exemplary embodiments of the present disclosure. The optical assembly blank 200' is shown in FIG. 3A with an optional annular lens flange 260'.

The exemplary film preform 100 can be insert molded to form the optical assembly blank 200' by inserting the film preform 100 into a mold and them molding the film preform 100 using a flowable material, as illustrated by the exemplary process shown in FIGS. 4A-4E. The insert molding can be injection insert molding, compression insert molding or some other form of insert molding.

It is typically preferable that the material that forms the optical assembly 110 is molten when it contacts optical stack 120 so that the material forms a suitable bond with MOF 250 without including any additional adhesive layers. In some embodiments, the material that forms the optical assembly 110 and the material that forms an outermost surface of MOF 250 are selected to be compatible with each other so that a suitable diffusion bond forms between MOF 250 and the optical assembly 110.

For example, in some embodiments, similar polymers, or otherwise compatible (e.g., partially miscible) are used for the material that forms the optical assembly 110 and the material that forms the outermost surface of MOF 250 facing the optical assembly 110. The similar or compatible polymers may have approximately equal melting points (e.g., within 50° C., or within 30° C., or within 20° C., or within 10° C.), for example. In some embodiments, optical stack 120 includes an optical film including a plurality of alternating polymeric layers and the bonding of the optical film to the optical assembly 110 is stronger than an interlayer bonding between at least one pair of immediately adjacent layers in the optical film.

Optical Assemblies with Encapsulated MOF

Figure 3B:
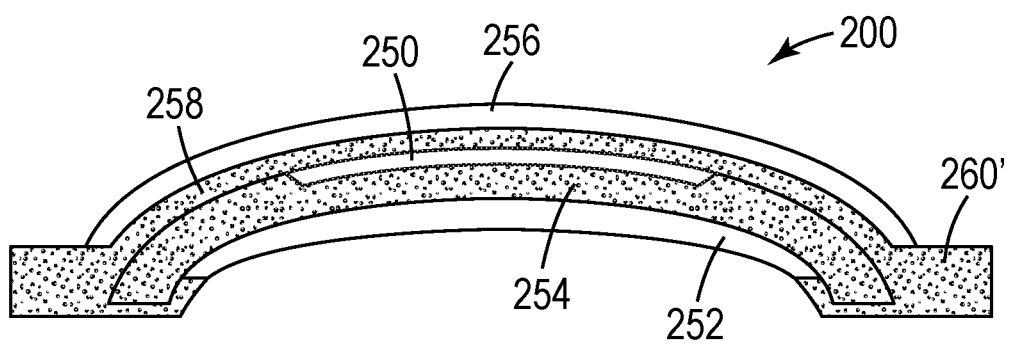
FIG. 3B is a schematic cross-sectional view of an exemplary optical assembly including an encapsulated multilayer optical film according to exemplary embodiments of the present disclosure.

FIG. 3B is a schematic cross-sectional view of an exemplary optical assembly 200 including an encapsulated multilayer optical film 250 according to exemplary embodiments of the present disclosure. The exemplary optical assembly 200 includes a multilayer optical film 250, a first flowable material 254, a first hard-coat film 252 with an at least partially cured hard-coat composition, second flowable material 258, and a second hard-coat film 256 with an at least partially cured hard-coat composition. The optical assembly 200 is shown in FIG. 3B with an optional annular lens flange 260'.

As used herein, the term "integrally formed" means that the elements of an optical assembly are manufactured together rather than manufactured separately and then subsequently joined. Integrally formed includes manufacturing a first element followed by manufacturing the second element on the first element.

An optical film (e.g., a reflective polarizer) including a plurality of layers is integrally formed if the layers are manufactured together (e.g., combined as melt streams and then cast onto a chill roll to form a cast film having each of the layers, and then orienting the cast film) rather than manufactured separately and then subsequently joined. An additional layer not integral with the integrally formed multilayer optical film means that the additional layer is not integrally formed with the multilayer optical film. For example, the additional layer may be formed separately and then subsequently adhered (e.g., laminated using an optically clear adhesive) to the multilayer optical film.

In some embodiments, the MOF 250 is disposed in the optical assembly 200 such that the MOF has a radius of curvature in a range from about 6 mm to about 1000 mm in each of two mutually orthogonal directions (e.g., x- and y-directions). A surface may be described as substantially planar if a best-fit sphere has a radius greater than about 2000 mm.

In some embodiments, the MOF 250 is a reflective polarizer. Examples of reflective polarizers include a multilayer polymer film reflective polarizer and a wire-grid polarizer which may include wires extending generally in a block axis of the reflective polarizer and disposed on a substrate which may be a polymeric substrate.

In some embodiments, the MOF 250 comprises a plurality of alternating polymeric layers reflecting or transmitting light primarily by optical interference. In some embodiments, the MOF 250 includes an integrally formed multilayer optical film and at least one additional layer that is not integral with the multilayer optical film.

In some embodiments, the MOF 250 is a minor film (e.g., visible mirror or infrared minor) or a reflective polarizer film. In some embodiments, each location over at least about 80%, or at least about 90%, or at least about 95%, or all of a total area of the MOF 250 has a reflectance greater than about 80%, or greater than about 90%, or greater than about 95% for normally incident light having a same predetermined wavelength and a same first polarization state.

The predetermined wavelength may be any or all wavelengths in a predetermined wavelength range. The predetermined wavelength range may be the visible range (400 nm to 700 nm) and/or may include infrared and/or ultraviolet wavelengths. In some embodiments, the predetermined wavelength is about 550 nm.

In some embodiments, each location over at least about 80%, or at least about 90%, or at least about 95%, or all of a total area of the MOF 250 has a reflectance greater than about 80%, or greater than about 90%, or greater than about 95% for normally incident light having the same predetermined wavelength and a same second polarization state orthogonal to the first polarization state.

A polarization state can be characterized by the direction of the electric field vector which for normally incident light defines an axis tangent to the optical film. If the axis tangent to the optical film or optical stack along the electric field of normally incident light at two different locations on the optical film are in parallel planes that each intersect the optical film along a curve, the polarization states can be considered to be the same.

If the axis that is tangent to the optical film or optical stack and that is perpendicular to the electric field of normally incident light at two different locations on the optical film are in parallel planes that each intersect the optical film along a curve, the polarization states can also be considered to be the same. For example, light traveling parallel to the minus z direction and incident on the apex (point with largest z-coordinate) of MOF 250 may have a first polarization state with the electric field along the y-direction and a second polarization state with the electric field along the x-direction.

In some embodiments, MOF 250 includes an optical film where the optical film is a reflective polarizer substantially reflecting normally incident light having the predetermined wavelength and a block polarization state and substantially transmitting normally incident light having the predetermined wavelength and an orthogonal pass polarization state. Substantially reflecting can be understood to mean a reflectivity of at least 60% and substantially transmitting can be understood to mean a transmittance of at least 60%.

The block polarization state of a reflective polarizer can be described as the polarization state having the lowest transmittance through the reflective polarizer and the pass polarization state is the orthogonal polarization state. The block polarization state at the center of the reflective polarizer may be the first polarization state. The block polarization state may vary (e.g., the block axis may vary by less than about 5 degrees, or less than about 2 degrees in plan view) from the first polarization state away from the center location due to variations induced by thermoforming the optical film into a curved shape, for example.

The reflectance and/or transmittance may be specified over an area A which is some specified fraction of the total area of the optical stack or the optical film. For example, the area A may be at least about 80% of the total area and may exclude 20 percent of the total area near the perimeter of the optical stack, for example. In some embodiments, the area A is the total area of MOF 250 or 120*b* or the total area of the optical film included in the optical stack.

In some embodiments, the optical assembly 200 is a lens. In some embodiments, optical assembly 200 is a convex les. In some embodiments, optical assembly 200 is a concave lens. In some embodiments, the lens has refractive optical power in a least one direction. For example, optical assembly 200 may be a cylindrical lens having optical power in one direction (e.g., x-direction) or a spherical or aspherical lens having optical power in two directions (e.g., x- and y-directions).

The thickness at a location of an optical assembly 250 can be described as the shortest distance through the location and through opposing major surfaces of the optical assembly. In embodiments where the optical assembly 250 is a lens, the lens may have a thickness that varies with location by no more than about 50% ((H2−H1))/H1*100% is no more than about 50%), or no more than about 30%, or no more than about 20%, or no more than about 10%.

In some embodiments, the lens has a lens thickness that varies with location by at least about 20% ((H2−H1))/H1*100% is at least about 20%), or at least about 30%, or at least about 40%, or at least about 50%, or at least about 60%, or at least about 75%, or at least about 100%, or at least about 150%, or at least about 200%.

A lens thickness that varies with location by at least a specified percentage will have at least one first lens location that is at least the specified percentage greater than the lens thickness at at least one second lens location. For example, if H2 is at least 1.5 times H1, then the lens thickness varies with location by at least 50% and the thickness H2 at a center location is at least 50% greater than the thickness H1 at an edge location.

In some embodiments, other types of optical assemblies may be formed. For example, the optical assembly may be a prism and MOF 250 may be encapsulated within the prism.

Methods of Making a Shaped Optical Assembly Including an Encapsulated MOF

In other embodiments of the present disclosure, a method of making a shaped optical assembly comprising an encapsulated (e.g., abrasion-resistant) multilayer optical film is described. The method includes:
  (i) forming an optical assembly blank by:
    (a) providing a female thermoforming mold having an internal mold cavity defined by a curved concave platen and a curved convex platen opposite the curved concave platen, wherein the curved concave platen and the curved convex platen are separable when the female thermoforming mold is open, separated by a first gap when the internal cavity is being injected with a molten resin, and separated by a second gap smaller than the first gap when the female thermoforming mold is closed;
    (b) opening the female thermoforming mold and positioning a multilayer optical film preform in contact with the curved convex platen, wherein the multilayer optical film preform has a curvature substantially identical to that of the curved convex platen;
    (c) positioning a first hard coat film preform with a hard-coat in contact with the curved concave platen, wherein the first hard coat film preform has a curvature substantially identical to that of the curved concave platen, the first hard coat film preform comprising a first (co)polymeric substrate having two opposed major surfaces and an at least partially cured hard coat layer on at least one of the opposed surfaces, the at least partially cured hard coat layer being formed by at least partially curing a curable hard coat composition;
    (d) injecting a first flowable material into the internal mold cavity while the curved concave platen and the curved convex platen are maintained separated by the first gap;
    (e) closing the female thermoforming mold to achieve the second gap and cooling the mold while maintaining the second gap in order to solidify the first flowable material and form the optical assembly blank;
  (ii) opening the female thermoforming mold and positioning the optical assembly blank in contact with the curved concave platen;
  (iii) positioning a second hard coat film preform in contact with the curved convex platen, wherein the second hard coat film preform has a curvature substantially identical to that of the curved convex platen, the second hard coat film preform comprising a second (co)polymeric substrate having two opposed major surfaces and an at least partially cured hard coat layer on at least one of the opposed surfaces, the at least partially cured hard coat layer being formed by at least partially curing a curable hard coat composition substantially identical to the curable hard-coat composition of step (c);

iv) injecting a second flowable material into the internal mold cavity while the curved concave platen and the curved convex platen are maintained separated by the first gap;

v) partially closing the female thermoforming mold to achieve a third gap between the first gap and the second gap and cooling the mold while maintaining the third gap in order to solidify the second flowable material and obtain the shaped optical assembly, wherein the multilayer optical film is encapsulated by the first and second flowable materials.

The curable hard-coat composition of step (c) includes:

G. 70 to 96 weight percent of at least one urethane (meth)acrylate compound having an average (meth) acrylate functionality of 2 to 9.5, based on the total weight of components A to D, H. 2 to 20 weight percent of at least one (meth)acrylate monomer having a (meth)acrylate functionality of 1 to 2, based on the total weight of components A to D, wherein the (meth)acrylate monomer does not comprise a urethane (meth)acrylate compound or a silicone (meth)acrylate, I. an optional 0.5 to 2 weight percent of at least one silicone (meth)acrylate based on the total weight of components A to D, J. an optional effective amount of at least one photoinitiator, K. an optional plurality of inorganic nanoparticles and L. optionally, at least one solvent.

Preferably the first and/or second flowable materials comprise one or more polycarbonate resins. Preferably first and second hard-coat film preforms each include a (copolymeric) substrate comprised of one or more polycarbonate resins. Preferably, the shaped optical assembly has a maximum thickness of 3 mm or less.

FIG. 4A-4E illustrate an exemplary process for injection insert molding of an exemplary optical assembly (e.g., a plastic lens) including an encapsulated multilayer optical film according to exemplary embodiments of the present disclosure.

Figure 4A:
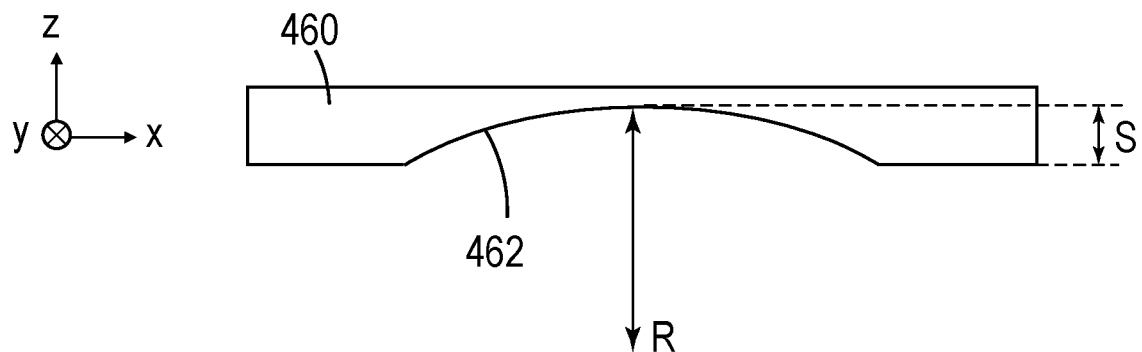
FIGS. 4A-4E illustrate an exemplary process for injection insert molding of an exemplary optical assembly including an encapsulated multilayer optical film according to exemplary embodiments of the present disclosure.
Figure 4B:
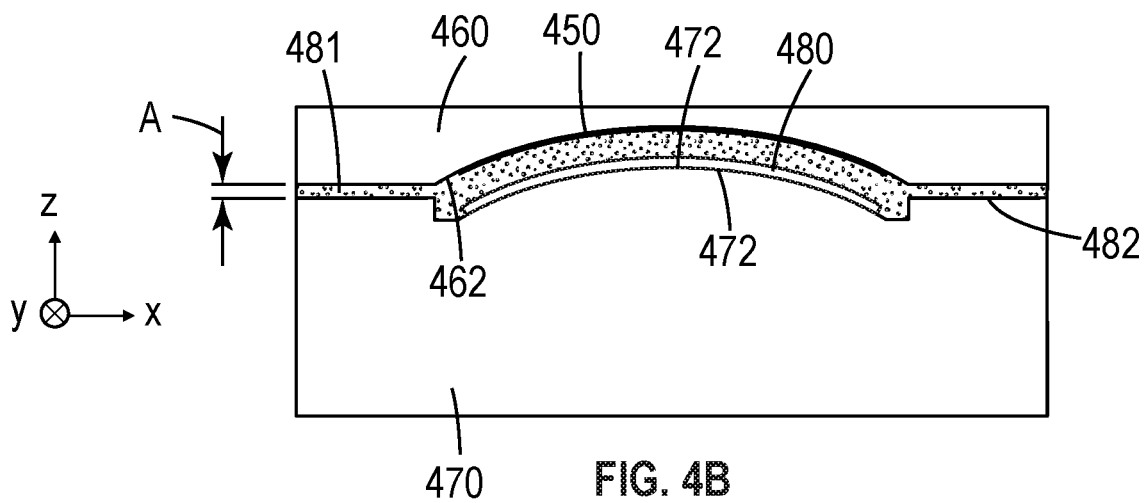
Figure 4C:
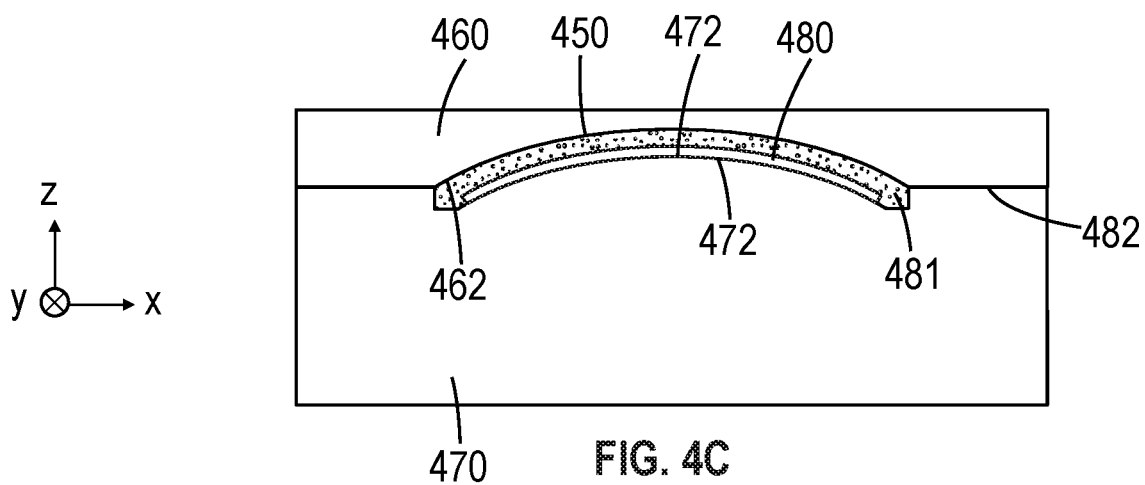

As shown in FIGS. 4A-4B, the method includes providing a first platen 460 having a first curved platen surface 462 (FIG. 4A) and placing an MOF preform 450 on the first curved platen surface 462 (FIG. 4B). The first curved platen surface 462 is preferably concave as shown in FIG. 4B. The MOF preform 450 is preferably shaped (e.g., via thermoforming) into a desired shape which substantially matches that of the first curved platen surface 462.

Next, as shown in FIG. 4B, a second platen 470 is disposed such that a second platen surface 472 is spaced apart from and aligned with the first curved platen surface 462. A first hard-coat film 480 is positioned on the second platen surface 472, which may be curved as illustrated in FIG. 4B, or substantially planar. The second platen surface 472 is preferably convex as shown in FIG. 4B. The first hard-coat film 480 preferably has a curable hard-coat composition on a major surface opposite the second platen surface 472. The first and second platen surfaces 462 and 472 define a mold cavity therebetween (FIG. 4B).

Thermoforming of a film or optical stack can be carried out by heating the film or optical stack, contacting the optical stack with a curved mold while stretching the optical stack as generally described by U.S. Pat. No. 9,557,568 (Ouderkirk et al.) and U.S. Pat. No. 6,788,463 (Merrill et al.), for example.

Next, the mold cavity is filled or substantially filed through gate 482 with a first flowable material 481 (FIG. 4B), while the curved concave first platen surface 462 and the curved convex second platen surface 472 are maintained separated by a first gap A. As own in FIG. 4C, the first platen 460 and second platen 470 are then positioned to achieve a second gap which is less than the first gap and preferably zero, such that the gate 482 is closed. The first platen 460 and second platen 470 are then cooled while maintaining the second gap in order to at least partially solidify the first flowable material 481 to form a solid optical assembly blank including the at least partially cured first hard-coat film 480 and the MOF 450 (see, e.g., optical assembly blank 200' including hard-coat film 252 and MOF 250 in FIG. 3A).

Figure 4D:
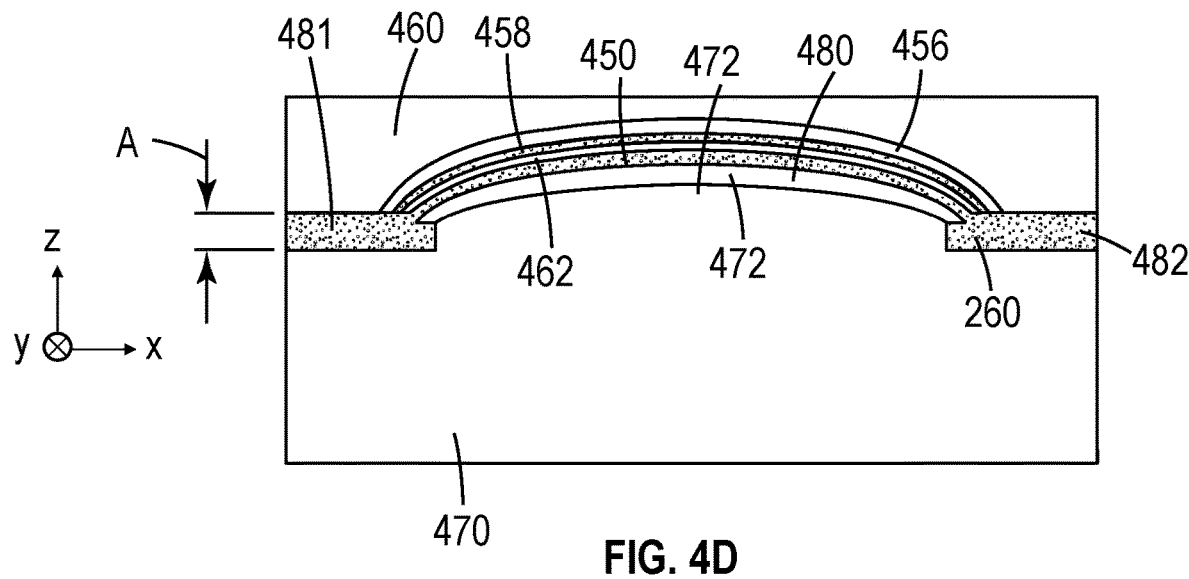
Figure 4E:
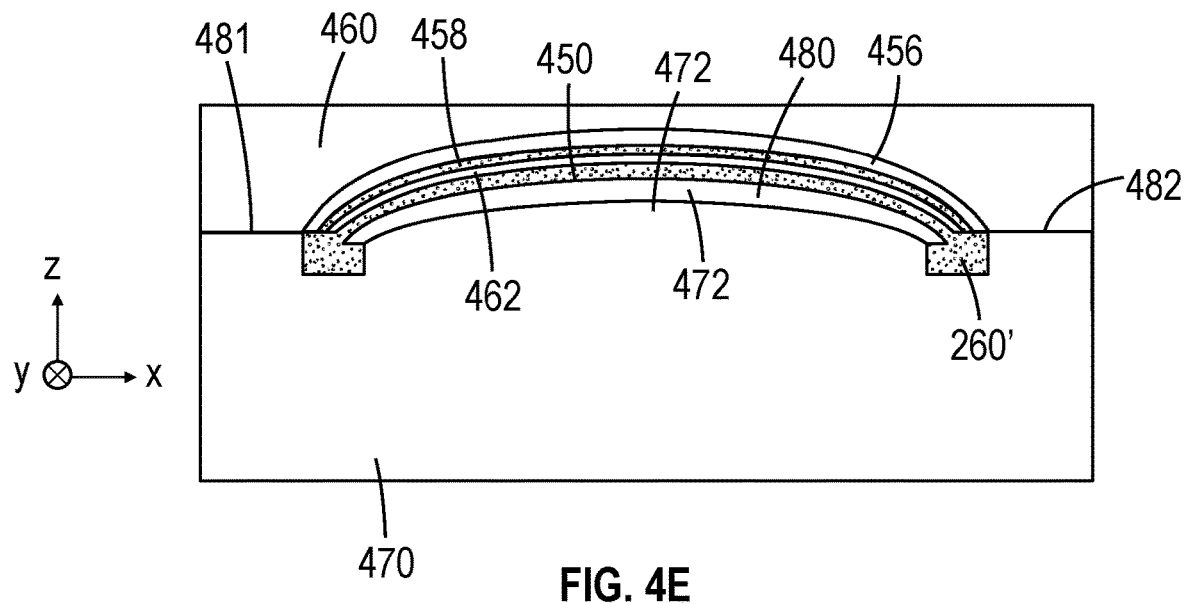

As shown in FIG. 4D, after opening the mold, a second hard coat film preform 456 is positioned in contact with the surface of the first curved convex platen 460. A second flowable material 458 is then injected through the gate 482 into the internal mold cavity while the curved concave first platen 460 and the curved convex second platen 470 are positioned to achieve a third gap between the first gap A and the second gap.

The first platen 460 and second platen 470 are then cooled while maintaining the third gap in order to solidify the second flowable material 458 (and thereby obtain the shaped optical assembly 200 as shown in FIG. 3B), wherein the multilayer optical film 450 (corresponding to 250 in FIGS. 3A-3B) is encapsulated by the first and second flowable materials 458 and 458 (corresponding to 254 and 258, respectively in FIG. 3B) and protected by first hard-coat film 472 (252 in FIGS. 3A-3B) and second hard-coat film 456 (corresponding to 256 in FIG. 3B).

Substantially filling the mold cavity can be understood to mean filling the mold cavity to greater than 50 percent by volume. In some embodiments, the mold cavity is filled to at least 80 percent by volume, or to at least 90 percent by volume, or to at least 95 percent by volume. In some embodiments, the mold cavity is completely filled with the second flowable material 458 except for the volume occupied by the first and second hard coat film preforms (480 and 456, respectively in FIGS. 4D-4E) and MOF (450 in FIGS. 4B-4E).

In some embodiments, the second flowable material 458 has a temperature greater than a glass transition temperature of the optical assembly blank 200' when the second flowable material 458 flows into the cavity. In some embodiments, the first platen 460 and second platen 470 are held at a temperature below a melting point of the second flowable material 458 in order to solidify the second flowable material 458.

In some embodiments, the temperature of the first platen 460 and second platen 470 are also below the glass transition temperature of the optical assembly blank 200' when the second flowable material 458 flows into the cavity 480. For example, the second flowable material 458 may have a temperature in a range of 250 to 300° C. when it is introduced into the cavity 480, the first and second plates (460 and 470) may have a temperature in a range of 75 to 100° C., and the optical stack 720 may have a glass transition temperature in a range of 105 to 130° C.

In some embodiments, a melting temperature of the formed optical assembly 200 is substantially larger than the glass transition temperature of the optical film or optical stack (the glass transition temperature may be any of the glass transition temperatures described above). A substantially larger temperature refers to a temperature greater than 10° C. larger unless indicated differently. In some embodiments, the melting temperature of the optical assembly is at least about 50° C. larger, or at least about 80° C. larger than the glass transition temperature of the optical film. In some embodiments, an absolute value of a difference between the melting temperature of the optical assembly and a melting temperature of the optical film is less than about 50° C., or less than about 30° C., or less than about 20° C., or less than about 10° C. In some embodiments, a melting temperature of the optical assembly is about the same as a melting temperature of the optical film. About the same temperature refers to temperatures differing by less than 10° C. unless indicated differently.

The glass transition temperature of the various films or layers can be determined by differential scanning calorimetry as described in the test standard ASTM E1356-08(2014) "Standard Test Method for Assignment of the Glass Transition Temperatures by Differential Scanning calorimetry".

The first curved mold surface 462 has a best-fit spherical first radius of curvature R which, in some embodiments, is in a range from about 30 mm to about 1000 mm. The first curved mold surface 462 has a sag S. In some embodiments, a ratio of the sag S to the best-fit spherical first radius of curvature R is in a range of about 0.02 to about 0.2, or in a range of about 0.02 to about 0.15, or in a range of about 0.02 to about 0.12, or in a range of about 0.03 to about 0.12, or in a range of about 0.04 to about 0.12.

The insert molding process can be repeated using a first optical assembly injection molded onto an optical film as an insert for a second insert molding process that forms a second optical assembly on the optical film opposite the first optical assembly.

Optional Edge Mounted Retainer Rings

In some exemplary embodiments, it may be advantageous to include a retaining ring over-molded, machined, 3D-printed or attached to the annular lens flange 260' around all or part of the perimeter of the shaped optical assembly. The retaining ring may advantageously act to further prevent delamination of the multilayer optical film from the optical assembly during machining of the lens or subsequent use of the eyewear frame by a user, particularly when the multilayer optical film is smaller in extent than the lens blank. The retaining ring may also allow the use of the lens in partial rim eyewear frames and prevent light leaks between the eyewear frame and the lens.

In certain exemplary embodiments, the retaining ring is advantageously created as part of the process of machining the shaped optical assembly into a finished lens prior to insertion of the cut to shape lens into a corresponding eyewear frame. This facilitates manufacture of a single-sized lens blank which can be cut or machined to shape using standard lens edging equipment.

Figure 5A:
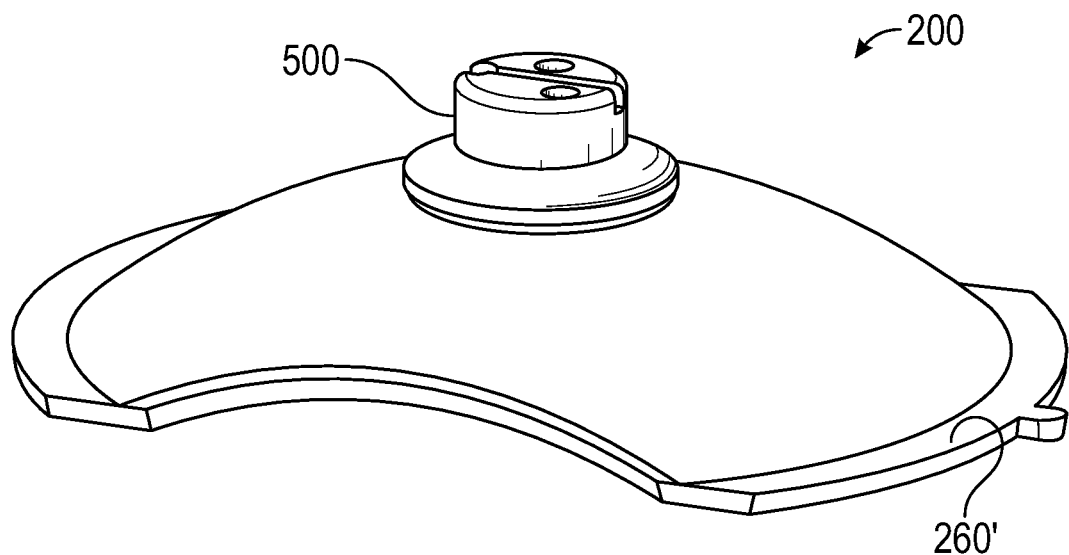
FIGS. 5A-5D are perspective views illustrating an exemplary embodiment of an optical assembly including an encapsulated multilayer optical film and having an edge flange adapted to facilitate mounting in eye wear according to exemplary embodiments of the present disclosure.
Figure 5B:
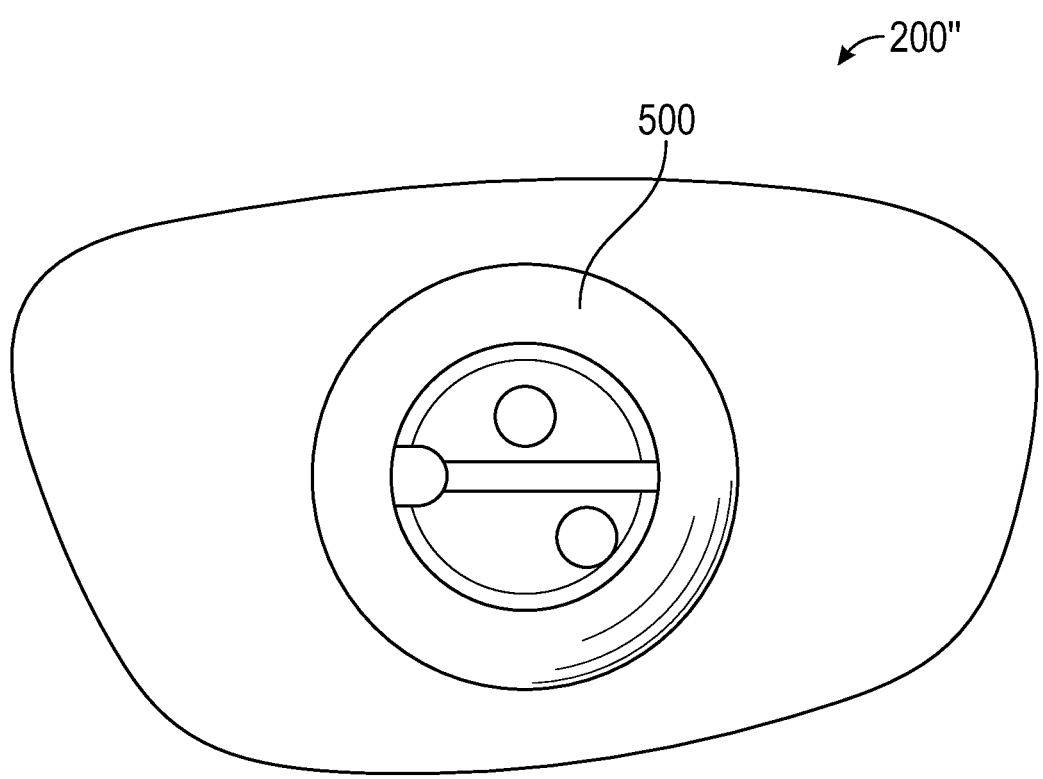

FIGS. 5A-5D illustrate exemplary steps for machining the lens and over-molding a retaining ring 502 into an optical assembly 200. As shown in FIG. 5A, it may be advantageous to adhere an edging block 500 affixed to a major surface of the optical assembly 200 centrally located relative to the annular lens flange 260' of the optical assembly 200. One suitable edging block 500 is an adhesive pad such as 3M "Leap III", which is preferably adhered to the convex side of the lens as shown in FIG. 5B. This allows the lens to be cut to the eyewear frame shape, the MOF thereby being cut to the same shape such that the MOF covers the entire viewing area of the cut-to-shape lens.

Figure 5C:
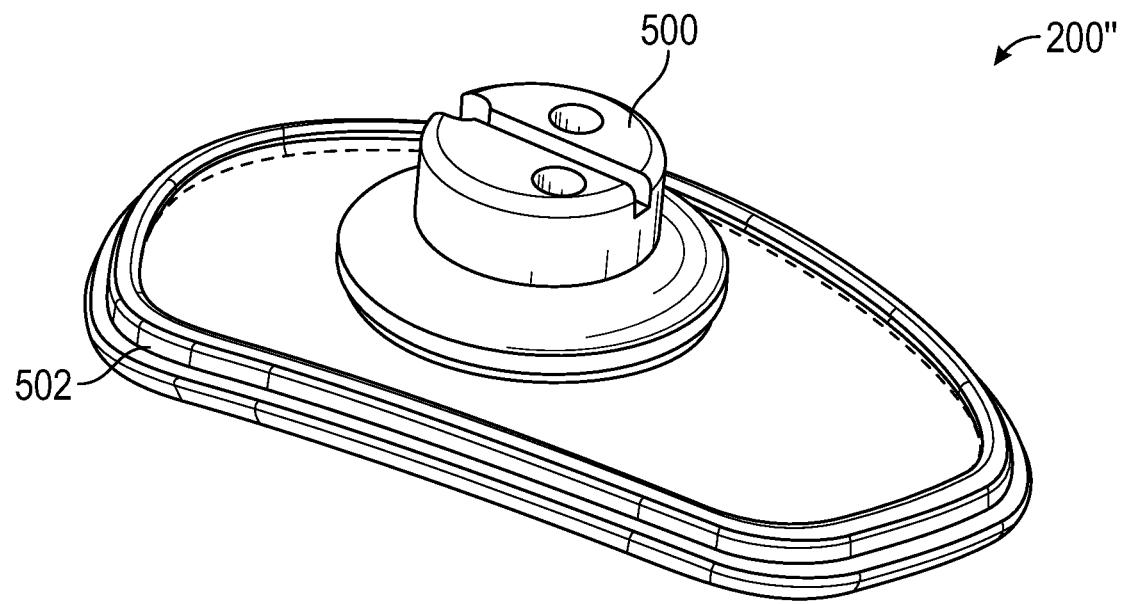

The cut to shape lens 200" can then be placed in a mold (not shown) using the edging block for spatial location, the edging block having features (e.g., diameter, slot and pin holes) allowing for accurate placement of the cut to shape lens 200" in the mold. A retaining ring 502 is then over-molded onto the cut-to-shape lens to fully encapsulate the edge perimeter of the cut to shape lens 200", as shown in FIG. 5C.

Figure 5D:
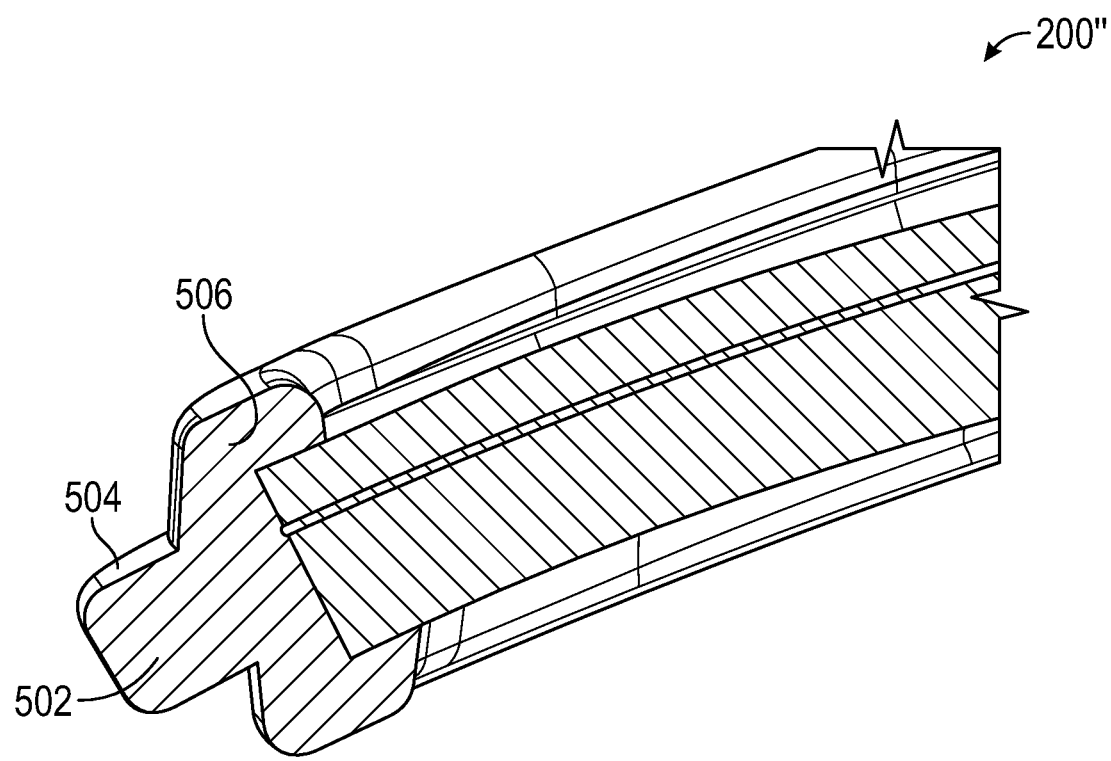

FIG. 5D shows a magnified view of the over-molded retaining ring 502 of the cut to shape lens 200". Optional edge facets 504 and edge steps 506 may be incorporated into the retaining ring 502 by appropriate design of the mold used in the over-molding process as will be readily apparent to one of skill in the art. Such edge facets 504 and edge steps 506 can provide additional surface area to rigidly secure the cut to shape lens 200" in the eyewear frame, while preventing the front and back faces of the lens from delaminating, thereby protecting the MOF and acting to prevent light leakage around the MOF edges.

Figure 6A:
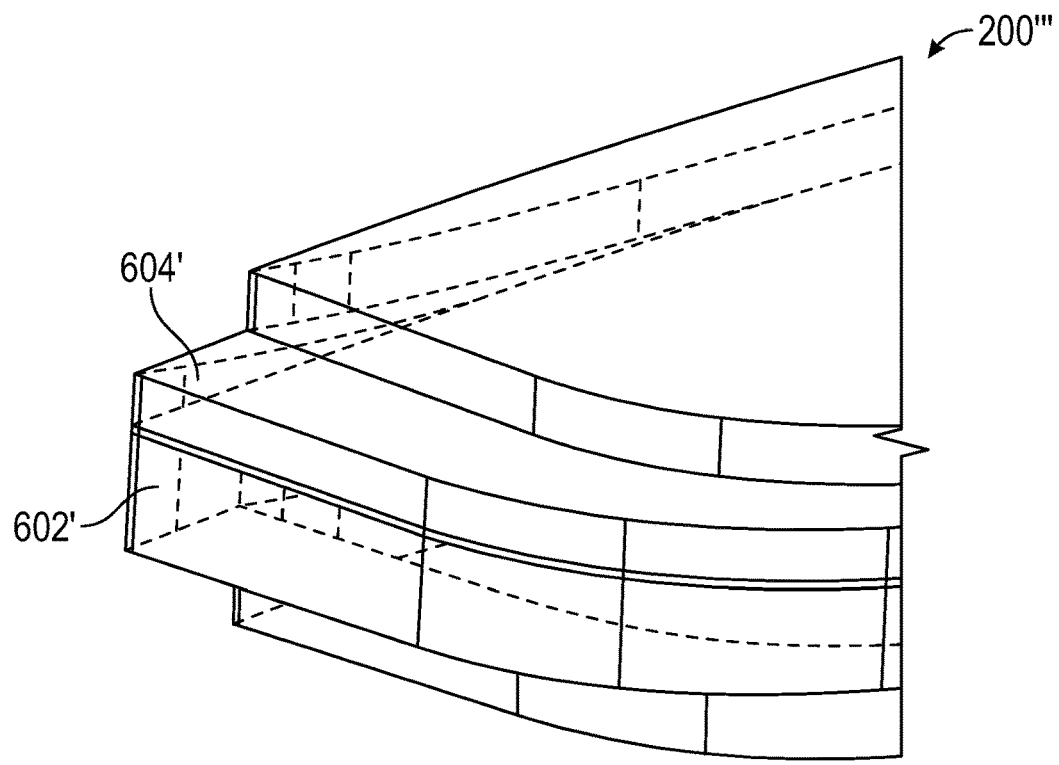
FIGS. 6A-6B are perspective views of an optical assembly including an encapsulated multilayer optical film and having an edge retaining ring according to exemplary embodiments of the present disclosure.
Figure 6B:
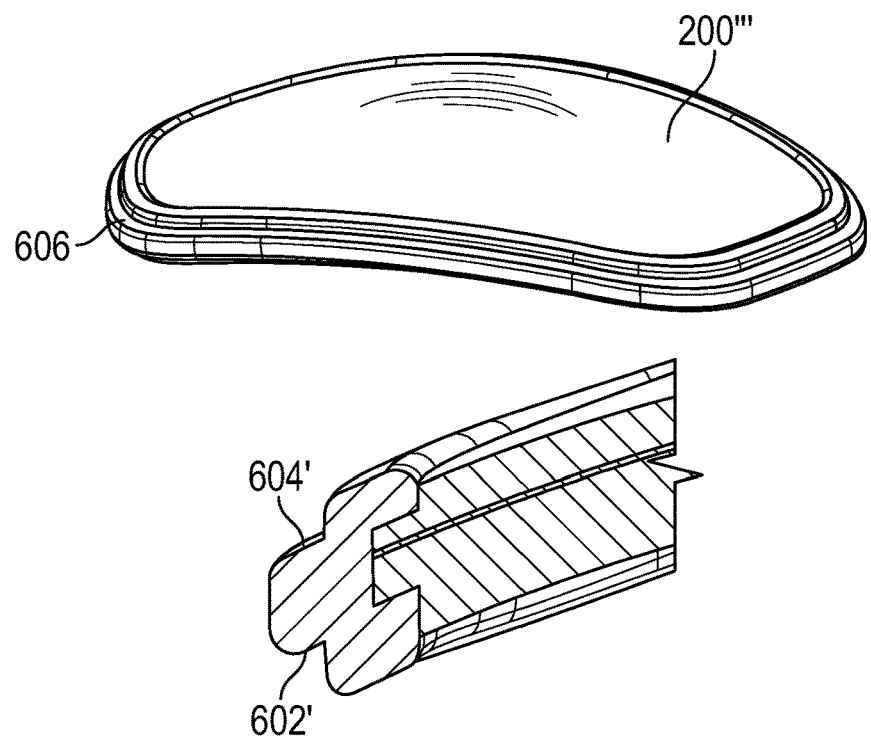

FIGS. 6A-6B illustrate an alternate embodiment in which a retaining ring 602' in the form of a shoulder 604' is machined into the annular lens flange 606 on the front (convex) and back (concave) side of the cut to shape lens 200''' during the lens shaping process. This allows for a lower profile retaining ring 602', thereby improving the peripheral field of view through the lens when mounted into the eyewear frame.

Figure 7:
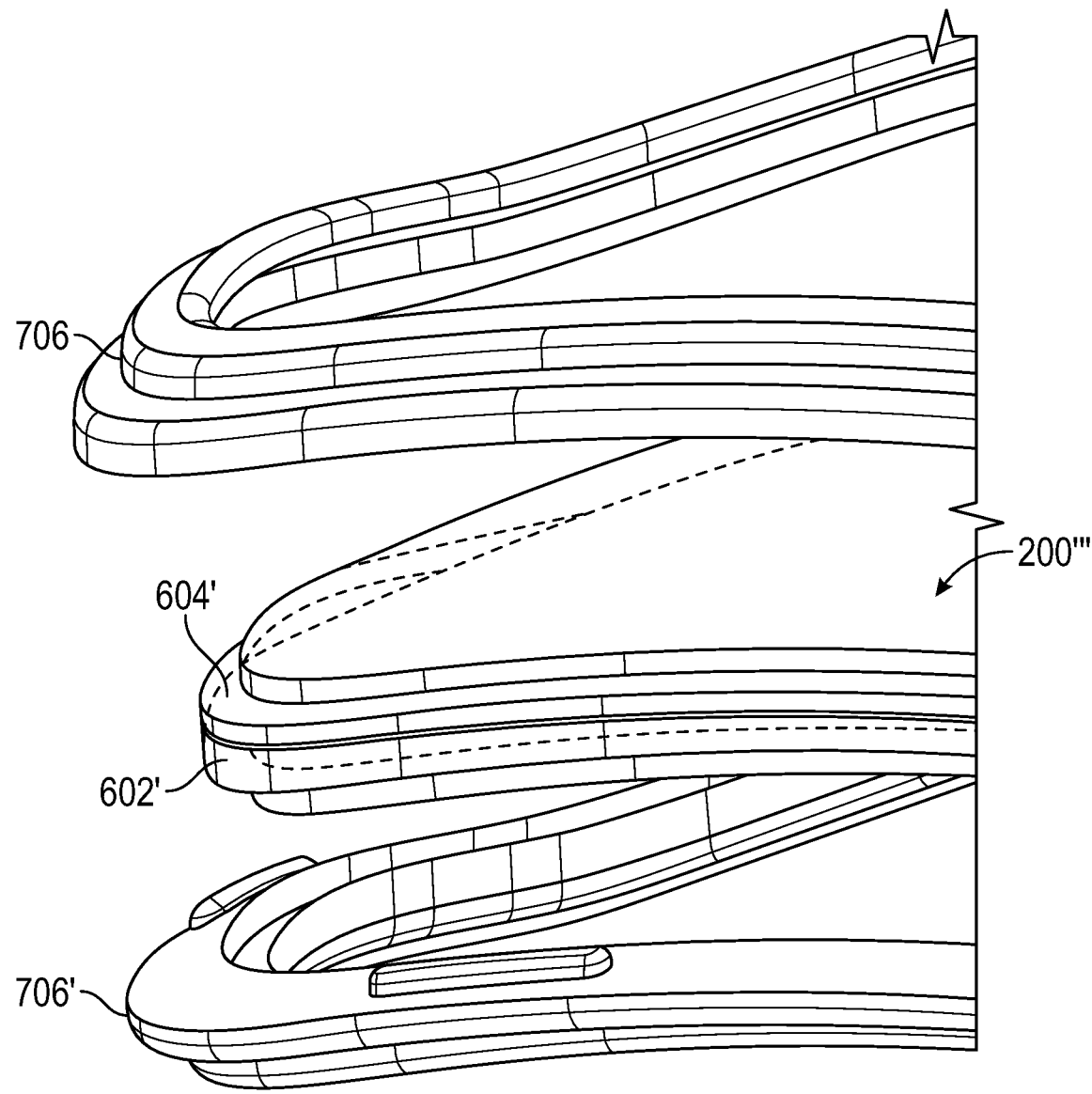
FIG. 7 shows perspective views of an alternative optical assembly including an encapsulated multilayer optical film and having an edge retaining ring according to another exemplary embodiment of the present disclosure.

Alternatively, as shown in FIG. 7, the retaining ring 602' has a shoulder 604' formed by over-molding or machining the annular lens flange on the front (convex) and back (concave) side of the cut to shape lens 200''' during the lens shaping process. A first gasket 706 and second gasket 706' can be positioned on each side of the shoulder 604' of retaining ring 602' and adhered or ultrasonically welded together to encapsulate the retaining ring 602' of the cut-to-shape lens 200'''.

Figure 8:
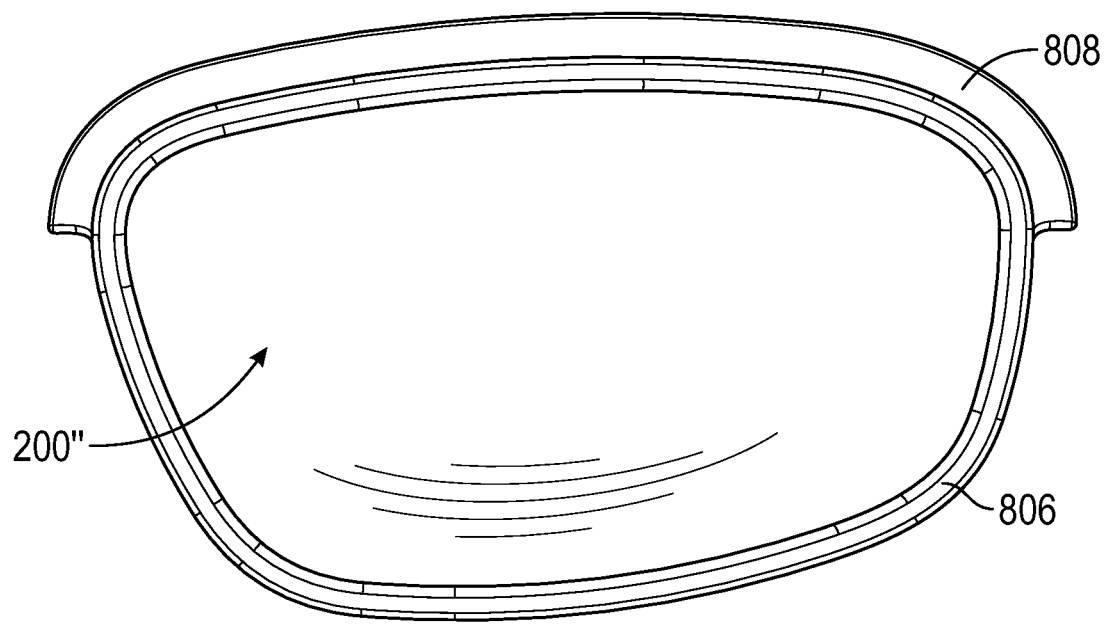
FIG. 8 shows a perspective view of another variation of an optical assembly including an encapsulated multilayer optical film and having an edge retaining ring according to another alternative exemplary embodiment of the present disclosure.

In another embodiment shown in FIG. 8, the retaining ring 806 can be formed discontinuously around the perimeter of the cut to shape lens 200" as a tab 808, hook (not shown) or any other discontinuous feature useful to attach the lens into the eyewear frame, thus allowing for a partial engagement of the tab 808 into the eyewear frame (not shown), thereby resulting in a visually less obtrusive retaining ring 806.

Figure 9:
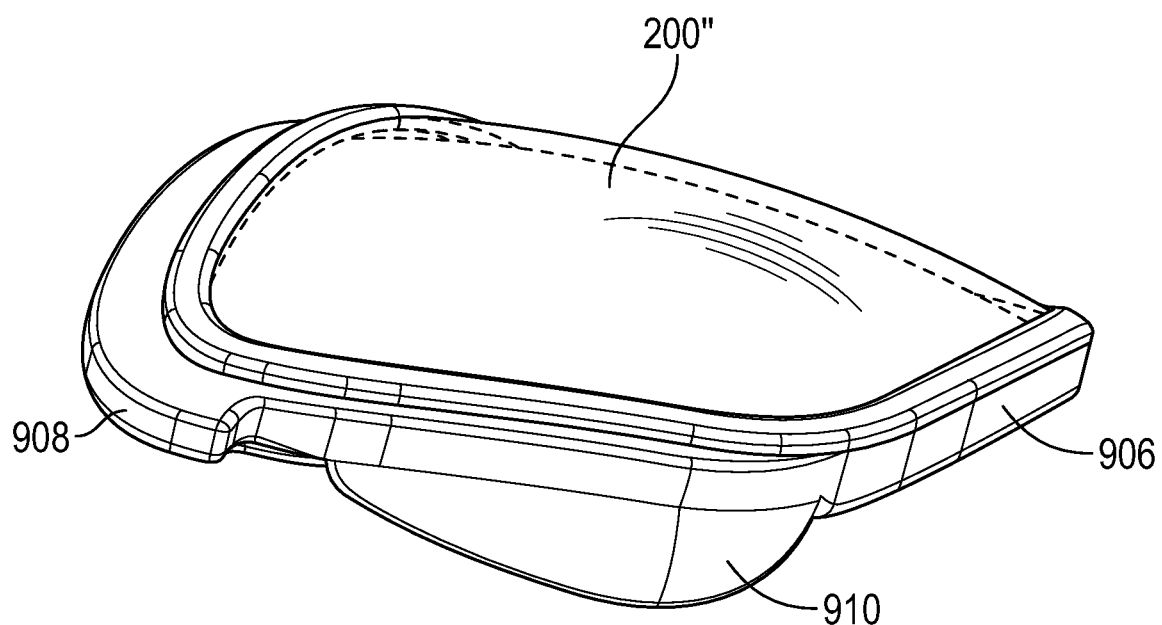
FIG. 9 shows a perspective view of an optical assembly including an encapsulated multilayer optical film and having an edge retaining ring according to a further exemplary embodiment of the present disclosure.

In yet another embodiment illustrated in FIG. 9, the retaining ring 906 of the cut to shape lens 200" can have additional machined, molded or 3D printed features, such as a nose-pad 910 or mounting tab 908.

Figure 10A:
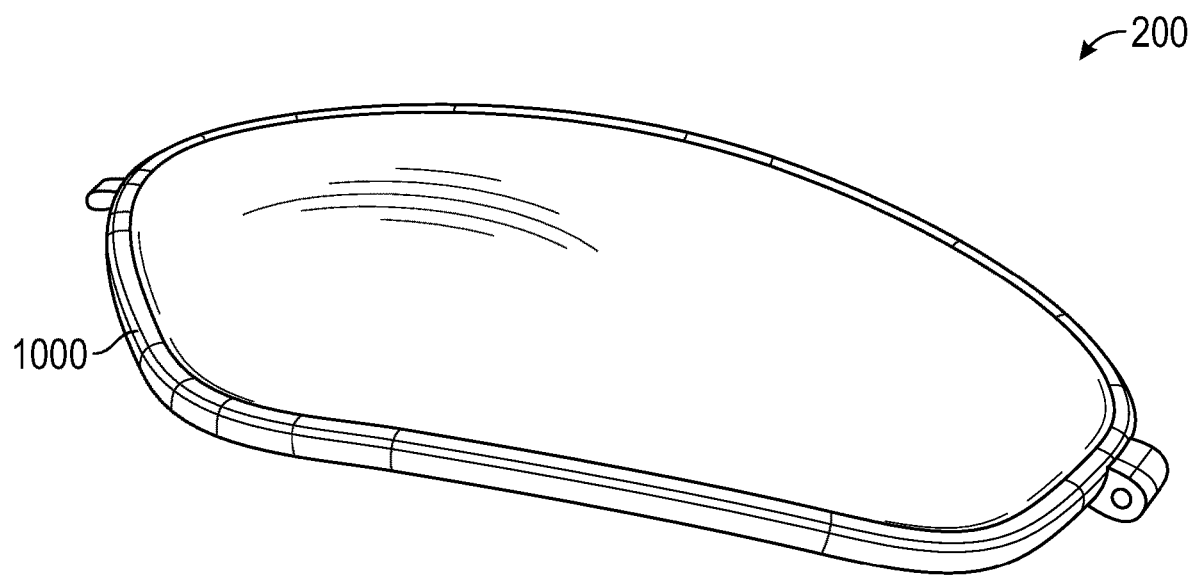
FIGS. 10A-10B show a perspective view of an optical assembly including an encapsulated multilayer optical film and having an edge retaining ring in the form of an eyewire according to alternative exemplary embodiments of the present disclosure.

In other exemplary embodiments, the retaining ring can be made of metal and mounting of the lens to the eyewear frame can be achieved using very simple tools by applying traditional lens mounting techniques well known to those skilled in the art. In the embodiment shown in FIG. 10A, a metal retaining ring in the form of eyewire 1000 is formed around the perimeter of the cut to shape lens 200 overlaying the annular lens flange using, for example, CNC forming equipment such as Schussller 504 or equivalent, the closing block and attachment tab being brazed onto the eyewire 1000. As the formed ring can be opened by removing a screw inserted in the closing block, the lens edging geometry and eyewire internal groove can be designed in such a fashion that the pressure exerted on the lens also helps prevent edge delamination of the MOF from the other parts of the cut to shape lens 200.

Figure 10B:
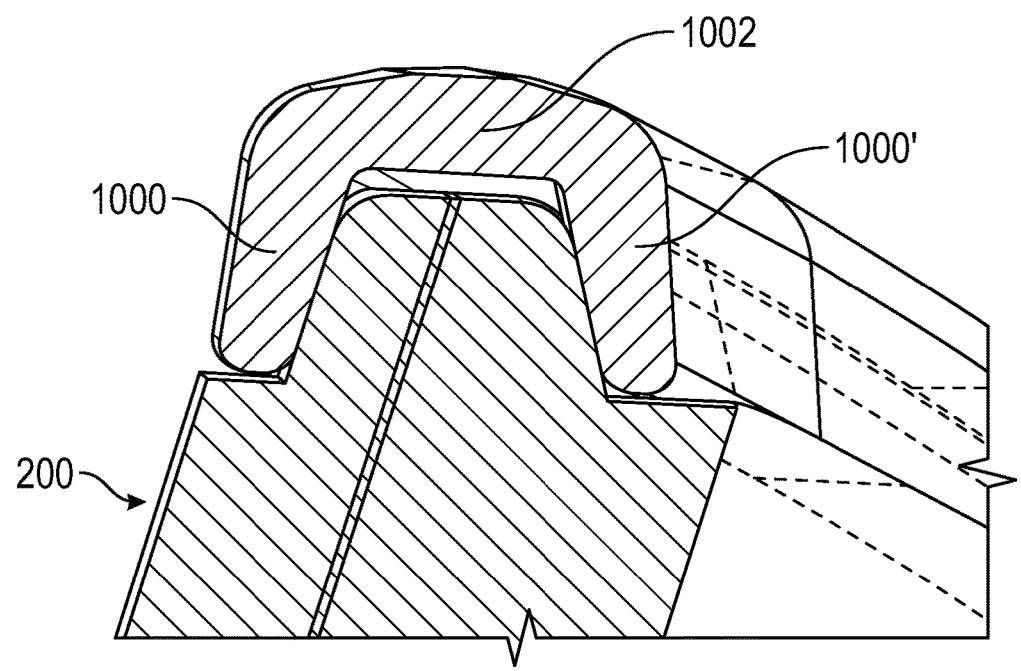

Alternatively, the eyewire may be formed separately and adapted to engage in a close fit with the annular edge flange of the cut to shape lens 20. In the magnified view shown in FIG. 10B, the eyewire inner groove 1002 engages in a close fit to the lens 200 due to a taper formed in the front side 1000' and back side 1000" of the eyewire, which match the taper cut into the front and back side of the perimeter (annular edge flange) of the cut to shape lens 200.

The eyewire 1000 also can be advantageously fabricated using powdered metal molding or metal 3D printing to form the retaining ring in place on the front and back side of the perimeter (annular edge flange) of the cut to shape lens 200, thereby eliminating secondary operations required to machine or finish the retaining ring. Use of 3D printing to form the eyewire 1000 in place on the perimeter (annular edge flange) of the cut to shape lens 200 also enables use of special materials, such as titanium, which can be difficult to process using traditional metal eyewear frame processing techniques, and also eliminate the need for specialized tooling.

Optical Properties

In some exemplary embodiments, the shaped optical assembly may exhibit certain advantageous optical properties, such as optical phase retardance, polarization, high optical reflectance of specific undesirable wavelengths of light and high optical transmittance of desirable wavelengths of light. Such shaped optical assemblies may be particularly useful in laser protection eyewear.

The optical retardance at a location in an optical assembly, such as a lens, is the phase retardance of light transmitted through the optical assembly that passes through the location and that has a shortest path through the optical assembly. When the opposing major surfaces of the optical assembly are about parallel, approximately normally incident light has the shortest path through the optical assembly. When the opposing major surfaces are not parallel, the shortest path may be for non-normally incident light.

The phase retardance is the maximum difference in phase for two orthogonally polarized light rays through the location. The wavelength of the incident light ray is about 550 nm unless specified differently. The optical retardance of an optical assembly may be characterized by the locations on a major surface of the optical assembly. In some embodiments, an optical assembly, such as a lens, has a low optical retardance. In some embodiments, the optical retardance is no more than about 10 nm at each location over at least 80%, or at least 90% of a major surface (by surface area) of the optical assembly. In some embodiments, the optical retardance at each location on the optical assembly is no more than about 10 nm, or no more than about 7 nm. In some embodiments, the optical assembly is a lens having an optical retardance at the center of the lens of no more than about 5 nm.

In some embodiments, the optical retardance is low (e.g., in any of the above ranges) even when the lens has a substantial thickness variation. For example, in some embodiments a lens has an optical retardance of no more than about 10 nm at each location over at least 80% of a major surface of the lens, and has a lens thickness at a first lens location at least about 20% greater, or at about least 30% greater, or at least about 40% greater, or at least about 50% greater, or at least about 75% greater, or at least about 100% greater, or at least about 150% greater, or at least about 200% greater than a lens thickness at a second lens location.

The optical retardance of an optical assembly can be made low (e.g., less than 10 nm) by using a low retardance material as the flowable material 458 in making the optical assembly and/or by maintaining the flowable material 458 at an elevated temperature after filling the mold cavity 480 with the flowable material 458 for long enough that the birefringence substantially relaxes out.

A suitable PMMA which provides low birefringence is Optimas 7500 available form Mitsubishi Gas Chemical Company, Inc., for example. It has been found that optical films having a plurality of alternating polymeric layers can still provide a high reflectivity for at least one polarization state when the lens or optical assembly has a melting point higher than a glass transition temperature of the optical film, but less than a melting temperature of the optical films, even when the optical assembly is allowed to relax to a low birefringence.

Even when the birefringence is allowed to relax to a lower value, there still may be a residual birefringence and optical retardance, though the optical retardance may be low (e.g., no more than 10 nm). In some embodiments, the optical retardance exhibits some spatial variation through the optical assembly while remaining no more than about 10 nm. In some embodiments, an optical retardance of the optical assembly, which may be a lens, at at least one location closer to an edge of the optical assembly is greater than an optical retardance of the optical assembly at at least one location closer to a center of the optical assembly.

The operation of certain embodiments of the present disclosure will be further described with regard to the following detailed examples.

EXAMPLES

These examples are offered to further illustrate the various specific and preferred embodiments and techniques. It should be understood, however, that many variations and modifications may be made while remaining within the scope of the present disclosure.

Laser Protection Film

An infrared-reflective multilayer optical film, which had greater than 99% reflection for normally incident light having wavelengths from 800-1300 nm, was made from two packets of 275 alternating microlayers layers of poly(ethylene naphthalate) (PEN) and poly(methyl methacrylate) (PMMA) having a layer thickness gradient, with each packet having a boundary layer of PEN. The outer layer of the combined two packet construction had skin layers of XYLEX RESIN polycarbonate polyester/blend from Sabic IP, Dusseldorf, Germany. The film was prepared generally according to the method described in U.S. Pat. No. 7,271,951 B2 (Weber et al.).

Hard Coat PC Film

The coating formulation was made by mixing 3.84 g of photo initiator ESACURE ONE, 1.92 g of TEG2100, 208.8 g of urethane acrylate 1427 (80 wt % in MEK), 28.35 g of SR611 (32 wt % in ethanol) followed by dilution with 288.0 g of ethanol and 36.0 g of 1-methoxy-2-propanol (Table 1). The resulting coating formulation had 32.1 wt % solids.

TABLE 1

| Materials | |
|---|---|
| Ingredient (Source) | Quantity (g) |
| 1427 Urethane Acrylate | 208.8 |
| TEG2100 | 1.92 |
| ESACURE ONE | 3.84 |
| Ethanol | 288.0 |
| (Sigma Aldrich) | |

TABLE 1-continued

| Materials | |
|---|---|
| Ingredient (Source) | Quantity (g) |
| 1-Methoxy-2-Propanol (PM) (Sigma Aldrich) | 36.0 |
| SR611 (32 wt %) | 28.35 |

The coating formulation was applied on 5 mil polycarbonate (PC) film substrate through a die on a tandem line. The coated width was 8 inches. The slot height and overbite were 5 and 1 mils, respectively. The web speed was 10 feet/min. The pump speed of the coating formulation into the die was 8.6 cc's. The coated film was first passed through an oven at 190° F. and then UV cured under nitrogen protection (H bulb, 300 watts, Fusion).

Hard-Coat Film Fabrication

A forming machine from Hy-Tech Forming Systems (USA), Inc. (Phoenix, AZ) was used to thermoform both the laser protection film and the hard coated PC film into the shape of the curved lens. The sample of the film was placed on the forming machine on top of a lower platen that included a female form machined from porous aluminum and maintained at a temperature of 80° F. An upper platen is pre-heated to 350° F. was then closed down on the lower platen clamping the edges of the film in place. A pressure of 60 psi was then applied to the bottom side of the film (through the porous aluminum) to press the film against the flat heated platen above. This pressure was maintained for 6 seconds. The bottom side pressure was released and a 475 psi pressure was applied to the upper side of the film to inflate the film into the female form below. The pressure was maintained for 6 seconds and then the formed part was removed from the machine. The result was a curved optical film having the shape of the lens surface in the injection molding tool.

Injection Molding, Lens

The injection mold process produces a 8 Base lens blank with the dimensions shown in the print below.

Example 1: (Insert Molding of a Lens onto APF)

A multilayer optical film reflective polarizer (Advanced Polarizing film (APF) available from 3M Company, St. Paul, MN) was thermoformed into an 8 Base lens shape as generally described in U.S. Pat. No. 9,557,568 (Ouderkirk et al.).

Optical film insert molding was done on a Krauss Maffei 65 ton injection molding machine using an 8 Base lens blank injection molding tool. The thermoformed optical film was trimmed to the correct size to fit in the injection molding tool and was then placed on the convex side of the molding tool. Next the injection molding process was performed using PMMA molding material (Optimas 7500, Mitsubishi Gas Chemical Company, Inc) injected at a temperature of 276° C. into the molding tool cavity at 99° C. The resulting optical assembly was removed from the injection molding machine after a total injection molding cycle time of 66 seconds. Visual inspection of the film before and after the thermoforming and molding process showed no noticeable change in reflectivity.

Example 2: (Insert Molding of a Lens onto Optical Assembly Blank, APF and Liner)

An optical stack was thermoformed into an 8 Base lens shape as generally described in U.S. Pat. No. 9,557,568 (Ouderkirk et al.). The optical stack was a multilayer optical film reflective polarizer (APF) with a protective film liner (OCPET NSA33T, Sun A Kaken Co, Ltd) disposed on each major surface of the APF. The liners were aligned with the APF and did not extend past the edges of the APF.

Optical stack insert molding was done on a Krauss Maffei 65 ton injection molding machine using an 8 Base lens blank injection molding tool. The thermoformed optical stack was trimmed to the correct size to fit in the injection molding tool and one of the liners were removed. The thermoformed optical stack and was then placed on the convex side of the molding tool with the remaining liner facing away from the mold cavity. Next the injection molding process was performed using PMMA molding material (Optimas 7500, Mitsubishi Gas Chemical Company, Inc) injected at a temperature of 268° C. into the molding tool cavity at 82° C. The resulting optical assembly was removed from the injection molding machine after a total injection molding cycle time of 66 seconds.

The process is a two-step injection compression molding process to achieve encapsulation of the laser protection film near the center of the lens.

In step 1, an Arburg 240 ton molding machine configured for injection/compression molding was used. The molten polycarbonate material used for injection/compression molding was Makrolon 3107. The injection molding process conditions were within the recommended supplier processing conditions for the Makrolon PC.

The first step in the molding process is to mold the first shot lens blank. This is done by placing the hard-coated PC film on the concave lens surface in the mold and the laser protection film on the convex lens surface of the mold. The parting line of the mold is closed with the optical surface retraced by 2 mm. The PC resin is injected into the mold cavity and during the filling the retracted optical surfaces are compressed to the final lens blank thickness of 1 mm. The resulting lens called the first shot has hard coated PC film on the convex side and laser protection film on the concave side with 1 mm of PC resin between the two films. The laser protection film is 1-1.5 mm smaller than the size and profile of the final lens profile that fits into the eyewear frame.

Step 2 of the process is to mold the second shot lens (final lens blank). This is done by placing the first shot lens on the concave lens surface of the mold and hard coated PC film on the convex lens surface of the mold. The parting line of the mold is closed with the optical surface retraced by 2 mm. The PC resin is injected into the mold cavity and during the filling the retracted optical surfaces are compressed to the final lens blank thickness of 3 mm. The resulting part is the final lens blank.

Machining of Final Lens Profile:

The molded lens blank is used to machine a lens profile to fit into the eyewear frame. The following are the details this process including the eyewear frame utilized:

Edger: National Optronics HORIZON
　Bevel Angle varying between 105 to 120° C.
Frame: 3M Safety Sunwear 1500 series
Ballistic Impact Testing:
　The finished lenses were tested in the 3M Safety Sunwear 1500 series frame using the CADEX ballistic impact tester according to the MCEP standard.
Ballistic Fragmentation Protection, Class I
　Class I eyewear frame must be tested both with and without prescription lenses (to include ±11 and ±5 prescriptions for CR39 lenses) to be approved for prescription use. The ballistic fragmentation test shall be conducted as specified in MIL-STD-662 with the following exceptions: electronic velocity detection devices (light beam or acoustic type) may be used to determine the velocity of the projectile, such devices placed no less than 20 cm and no more than 61 cm from the target; compressed gas propulsion of the projectile may be used.

The eyewear frame shall be mounted on an Alderson 50th percentile male head form in the as-worn position.

The 0.05 mm thick aluminum foil witness sheet shall be mounted within 5 cm of the eyewear frame behind the area of impact.

The eyewear frame shall be hit once with a .15 caliber, 5.8 grain, T37 shaped projectile at 640 to 660 feet per second at normal incidence to the primary lens within the critical area (defined by a circle having a 20 mm radius centered on the horizontal centerline and 32 mm from the vertical centerline).

Impacts should be alternated between the left and right sides during testing, and impact location varied within the critical area.

All impacts should be a minimum of 2 projectile diameters away from the edge of the lens.

The test shall be considered a failure if one or more of the following occur:
- if the aluminum foil witness sheet is punctured
- if the primary lens is cracked
- if the prescription lens is cracked (if tested)
- or if one or more fragments or eyewear components, either along the inside of the eyewear or that is needed for proper eyewear retention in the as worn position, becomes completely separated from the frame upon impact. This includes, but is not limited to, the primary lens).

The results of the impact testing are summarized in Table 2.

have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers

TABLE 2

| Description | Process | Molding Quantity | Lens | MOF | Hard Coat | Ballistic Test Results |
|---|---|---|---|---|---|---|
| Std HC Right Eye Design Profile | 180103-AG | 15 | Right Design Profile | 016112-014 | 6-7 Rod #9 (Blue Line) | Pass #1, #2 & #3- no cracks on eye side, delamination at 1$^{st}$ shot due to MOF at profile edge #4 crack on eye side due to MOF at profile edge |
| Std HC Right Eye Small Profile | 180103-AH | 4 | Right Small Profile | 016112-014 | 6-7 Rod #9 (Blue Line) | Pass #1, #2 & #3- no cracks on eye side |
| Std HC Left Eye Design Profile | 180103-AM | 2 | Left Design Profile | 016112-014 | 6-7 Rod #9 (Blue Line) | Pass Pass #1 & #2-no cracks on eye side |
| Alumina HC Right Eye Design Profile | 180103-AK | 5 (HC Film moved on 3 lenses) | Right Design Profile | 016112-014 | 20170814 Alumina (Green Line) | Pass #1-no cracks on eye side |

Descriptions for elements in figures should be understood to apply equally to corresponding elements in other figures, unless indicated otherwise. Although specific embodiments subsumed within that range (e.g., 1 to 5 includes 1, 1.5, 2, 2.75, 3, 3.80, 4, and 5). In addition, all numbers used herein are assumed to be modified by the term "about."

Furthermore, all publications and patents referenced herein are incorporated by reference in their entirety to the same extent as if each individual publication or patent was specifically and individually indicated to be incorporated by reference. In the event of inconsistencies or contradictions between portions of the incorporated references and this application, the information in the preceding description shall control.

Various exemplary embodiments have been described. These and other embodiments are within the scope of the following claims.

What is claimed is:

1. A method of making a shaped optical assembly including an encapsulated multilayer optical film, the method comprising:
   i) forming an optical assembly blank by:
      a) providing a female thermoforming mold having an internal mold cavity defined by a curved concave platen and a curved convex platen opposite the curved concave platen, wherein the curved convex platen and the curved concave platen are separable when the female thermoforming mold is open, separated by a first gap when the internal mold cavity is being injected with a molten resin, and separated by a second gap smaller than the first gap when the female thermoforming mold is closed;
      b) opening the female thermoforming mold and positioning a multilayer optical film preform in contact with the curved convex platen, wherein the multilayer optical film preform has a curvature identical to that of the curved convex platen;
      c) positioning a first hard coat film preform with a hard-coat in contact with the curved concave platen, wherein the first hard coat film preform has a curvature identical to that of the curved concave platen, the first hard coat film preform comprising a first (co) polymeric substrate having two opposed major surfaces and an at least partially cured hard coat layer on at least one of the opposed major surfaces, the at least partially cured hard coat layer being formed by at least partially curing a curable hard coat composition comprising:
         A. 70 to 96 weight percent of at least one urethane (meth)acrylate compound having an average (meth)acrylate functionality of 2 to 9.58, based on the total weight of components A to D,
         B. 2 to 20 weight percent of at least one (meth) acrylate monomer having a (meth)acrylate functionality of 1 to 2, based on the total weight of components A to D, optionally wherein the (meth) acrylate monomer does not comprise a urethane (meth)acrylate compound or a silicone (meth) acrylate,
         C. an optional 0.5 to 2 weight percent of at least one silicone (meth)acrylate based on the total weight of components A to D,
         D. an optional effective amount of at least one photoinitiator,
         E. an optional plurality of inorganic nanoparticles and
         F. optionally, at least one solvent;
      d) injecting a first flowable material into the internal mold cavity while the curved concave platen and the curved convex platen are maintained separated by the first gap;
      e) closing the female thermoforming mold to achieve the second gap and cooling the mold while maintaining the second gap in order to solidify the first flowable material and form the optical assembly blank;
   ii) opening the female thermoforming mold and positioning the optical assembly blank in contact with the curved concave platen;
   iii) positioning a second hard coat film preform in contact with the curved convex platen, wherein the second hard coat film preform has a curvature identical to that of the curved convex platen, the second hard coat film preform comprising a second (co) polymeric substrate having two opposed major surfaces and an at least partially cured hard coat layer on at least one of the opposed major surfaces, the at least partially cured hard coat layer being formed by at least partially curing a curable hard coat composition identical to the curable hard-coat composition of step (c);
   iv) injecting a second flowable material into the internal mold cavity while the curved concave platen and the curved convex platen are maintained separated by the first gap;
   v) partially closing the female thermoforming mold to achieve a third gap positioned between the first gap and the second gap and cooling the mold while maintaining the third gap in order to solidify the second flowable material and obtain the shaped optical assembly, wherein the multilayer optical film is encapsulated by the first and second flowable materials.

2. The method of claim 1, wherein the shaped optical assembly has a maximum thickness of 3 mm or less, optionally wherein the shaped optical assembly has a radius of curvature of 65 to 68 millimeters.

3. The method of claim 1, wherein the at least one urethane (meth)acrylate compound of component A includes at least one of an isocyanurate ring or a biuret group.

4. The method of claim 1, wherein the at least one (meth)acrylate monomer of component B comprises at least one of 1,6-hexanediol di(meth)acrylate or an alkoxylated tetrahydrofurfuryl (meth)acrylate.

5. The method of claim 1, wherein the at least one silicone (meth)acrylate of component C is present in the curable composition.

6. The method of claim 1, wherein the effective amount of a photoinitiator of component D is present in the curable composition.

7. The method of claim 1, wherein the plurality of inorganic nanoparticles of component E is present in the curable composition, optionally wherein the plurality of inorganic nanoparticles comprise α-alumina nanoparticles.

8. The method of claim 1, wherein the at least one solvent of component F is present in the curable composition.

9. The method of claim 1, wherein one or more of the first (co) polymeric substrate, the second (co) polymeric substrate, the first flowable material, and the second flowable material comprise one or more polycarbonate resins, optionally wherein at least one of following conditions applies: (i) the first flowable material is the same composition as the second flowable material; (ii) the first (co) polymeric substrate is the same composition as the second (co) polymeric substrate.

10. The method of claim 1, wherein the first gap is from 1.51 to 2.5 mm, the second gap is from 1 to 1.5 mm, and the third gap is from 1.6 to 3 mm.

11. The method of claim 1, wherein the multilayer optical film is a reflective polarizer film.

12. The method of claim 11, wherein the reflective polarizer film comprises an optical stack, and wherein a major surface of the reflective polarizer film comprises a layer that is coextruded with the optical stack.

\* \* \* \* \*